(12) United States Patent
Wirola et al.

(10) Patent No.: US 11,765,580 B2
(45) Date of Patent: Sep. 19, 2023

(54) ENABLING FLEXIBLE PROVISION OF SIGNATURE DATA OF POSITION DATA REPRESENTING AN ESTIMATED POSITION

(71) Applicant: HERE GLOBAL B.V., Eindhoven (NL)

(72) Inventors: Lauri Aarne Johannes Wirola, Tampere (FI); Jari Syrjarinne, Tampere (FI); Tommi Laine, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 338 days.

(21) Appl. No.: 16/721,311

(22) Filed: Dec. 19, 2019

(65) Prior Publication Data

US 2020/0204988 A1 Jun. 25, 2020

(30) Foreign Application Priority Data

Dec. 20, 2018 (EP) .................................... 18214721

(51) Int. Cl.
*H04W 12/03* (2021.01)
*H04W 12/037* (2021.01)
(Continued)

(52) U.S. Cl.
CPC .......... *H04W 12/037* (2021.01); *G05B 15/02* (2013.01); *H04L 9/30* (2013.01); *H04L 9/3242* (2013.01);
(Continued)

(58) Field of Classification Search
CPC ... H04W 12/037; H04W 12/63; H04W 64/00; H04W 76/10; H04W 12/069;
(Continued)

(56) References Cited

U.S. PATENT DOCUMENTS 6,049,333 A 4/2000 LaJoie et al.
6,448,925 B1 9/2002 Shridhara
(Continued)

FOREIGN PATENT DOCUMENTS

CN 106597363 A 4/2017
EP 2 746 813 A1 6/2014
(Continued)

OTHER PUBLICATIONS

Final Office Action for U.S. Appl. No. 16/723,802 dated Sep. 2, 2020, 18 pages.
(Continued)

*Primary Examiner* — Tuan C Dao
(74) *Attorney, Agent, or Firm* — ALSTON & BIRD LLP

(57) ABSTRACT

A method is provided that is performed by a mobile device at least partially under control of a positioning program. The method includes establishing or initiating establishing a secure communication path to a remote device for receiving one or more signature parameter data sets and receiving said signature parameter data set(s) via said secure communication path. The method also includes estimating a position of said mobile device at least partially based on radio signal parameter(s) obtained by said mobile device. The position data are obtained as a result of said estimating. The method further includes determining a digital signature of said position data at least partially based on at least one of said signature parameter data set(s). The method also includes providing said position data and said signature data to one or more application programs. A corresponding device and computer-readable storage medium are also provided.

20 Claims, 5 Drawing Sheets

(51) Int. Cl.
  *H04W 76/10* (2018.01)
  *G05B 15/02* (2006.01)
  *H04L 9/30* (2006.01)
  *H04L 9/32* (2006.01)
  *H04W 64/00* (2009.01)
  *H04W 12/63* (2021.01)
(52) U.S. Cl.
  CPC .......... *H04L 9/3247* (2013.01); *H04L 9/3273* (2013.01); *H04W 12/63* (2021.01); *H04W 64/00* (2013.01); *H04W 76/10* (2018.02)
(58) Field of Classification Search
  CPC .... H04W 12/104; H04W 12/79; G05B 15/02; H04L 9/30; H04L 9/3242; H04L 9/3247; H04L 9/3273
  See application file for complete search history.

(56) References Cited

U.S. PATENT DOCUMENTS

| | | |
|---|---|---|
| 6,501,956 B1 | 12/2002 | Weeren et al. |
| 7,305,232 B2 | 12/2007 | Ono et al. |
| 7,312,752 B2 | 12/2007 | Smith et al. |
| 7,574,202 B1 | 8/2009 | Tsao et al. |
| 7,716,740 B2 | 5/2010 | Robert et al. |
| 7,788,382 B1 | 8/2010 | Jones et al. |
| 7,859,462 B2 | 12/2010 | Small |
| 7,970,894 B1 | 6/2011 | Patwardhan |
| 8,571,578 B1 | 10/2013 | Chen et al. |
| 8,655,312 B2 | 2/2014 | Stahlberg et al. |
| 8,750,267 B2 | 6/2014 | Aggarwal et al. |
| 8,805,403 B2 | 8/2014 | Curticapean et al. |
| 9,113,291 B2 | 8/2015 | Venkatraman et al. |
| 9,167,386 B2 | 10/2015 | Valaee et al. |
| 9,258,713 B2 | 2/2016 | Rangarajan et al. |
| 9,301,100 B1 | 3/2016 | Jampani et al. |
| 9,374,709 B2 | 6/2016 | Peirce et al. |
| 9,420,430 B2 | 8/2016 | Wuoti et al. |
| 9,466,881 B1 | 10/2016 | Berry et al. |
| 9,503,864 B1 | 11/2016 | Chao et al. |
| 9,544,798 B1 | 1/2017 | Ahmadzadeh et al. |
| 9,794,753 B1 | 10/2017 | Stitt et al. |
| 9,849,978 B1 | 12/2017 | Carmack et al. |
| 9,867,039 B2 | 1/2018 | Wang et al. |
| 9,886,850 B2 | 2/2018 | Benhammou |
| 10,149,159 B1 | 12/2018 | Perfitt |
| 10,382,890 B1 | 8/2019 | Stirling |
| 10,511,392 B2 | 12/2019 | Khalajmehrabadi et al. |
| 10,530,486 B2 | 1/2020 | Aoyama et al. |
| 10,531,423 B1 | 1/2020 | Hassan et al. |
| 10,841,746 B2 | 11/2020 | Eashwaramoorthy |
| 2002/0026321 A1* | 2/2002 | Faris ................ A63F 13/216 705/311 |
| 2002/0165912 A1* | 11/2002 | Wenocur ................ H04L 51/00 709/203 |
| 2003/0065922 A1* | 4/2003 | Fredlund ............ H04L 63/0823 713/176 |
| 2003/0159033 A1* | 8/2003 | Ishiguro ................ H04L 9/0822 380/278 |
| 2005/0041634 A1* | 2/2005 | Aura ................ H04L 63/126 370/351 |
| 2006/0240840 A1 | 10/2006 | Morgan et al. |
| 2007/0049323 A1 | 3/2007 | Wang et al. |
| 2007/0198835 A1* | 8/2007 | Mudhar ............ H04L 63/0442 713/171 |
| 2009/0075630 A1* | 3/2009 | Mclean ................ H04W 12/30 455/410 |
| 2009/0088132 A1 | 4/2009 | Politowicz |
| 2010/0120422 A1 | 5/2010 | Cheung et al. |
| 2010/0122274 A1* | 5/2010 | Gillies ............ H04N 21/41407 725/23 |
| 2011/0009132 A1 | 1/2011 | Skarby et al. |
| 2011/0040978 A1* | 2/2011 | Tsao ................ G06Q 10/107 713/181 |
| 2011/0065450 A1 | 3/2011 | Kazmi |
| 2011/0087887 A1* | 4/2011 | Luft ................ H04W 12/10 713/178 |
| 2011/0131651 A1 | 6/2011 | Shanmugavadivel et al. |
| 2011/0154050 A1* | 6/2011 | Cordery ................ H04L 63/10 713/189 |
| 2012/0056785 A1 | 3/2012 | Jovicic et al. |
| 2013/0170378 A1 | 7/2013 | Ray et al. |
| 2013/0196684 A1 | 8/2013 | Dong |
| 2013/0252631 A1 | 9/2013 | Alizadeh-Shabdiz et al. |
| 2013/0303185 A1 | 11/2013 | Kim et al. |
| 2013/0310066 A1 | 11/2013 | Shu et al. |
| 2013/0310068 A1 | 11/2013 | Fischer et al. |
| 2013/0336138 A1 | 12/2013 | Venkatraman et al. |
| 2014/0130155 A1 | 5/2014 | An et al. |
| 2014/0150049 A1 | 5/2014 | Kwon et al. |
| 2014/0256348 A1 | 9/2014 | Wirola et al. |
| 2014/0259047 A1* | 9/2014 | Bakar ................ H04N 21/6371 725/30 |
| 2014/0344946 A1 | 11/2014 | Ward et al. |
| 2015/0050947 A1 | 2/2015 | Wirola et al. |
| 2015/0065166 A1 | 3/2015 | Ward et al. |
| 2015/0172289 A1 | 6/2015 | Kwon et al. |
| 2015/0215762 A1 | 7/2015 | Edge |
| 2015/0226858 A1 | 8/2015 | Leibner et al. |
| 2015/0247916 A1 | 9/2015 | Bartov et al. |
| 2015/0257179 A1* | 9/2015 | Kim ................ H04W 12/068 370/328 |
| 2015/0334676 A1 | 11/2015 | Hart et al. |
| 2015/0351017 A1 | 12/2015 | Wirola et al. |
| 2015/0381740 A1* | 12/2015 | Gwin ................ H04W 4/80 709/228 |
| 2016/0054427 A1 | 2/2016 | Wirola et al. |
| 2016/0066154 A1 | 3/2016 | Shin |
| 2016/0094947 A1 | 3/2016 | Shen et al. |
| 2016/0192136 A1 | 6/2016 | Pan et al. |
| 2016/0260059 A1 | 9/2016 | Benjamin et al. |
| 2016/0374046 A1 | 12/2016 | Wirola et al. |
| 2017/0026806 A1 | 1/2017 | Jampani et al. |
| 2017/0068902 A1 | 3/2017 | Kirshner |
| 2017/0078851 A1 | 3/2017 | Agrawal et al. |
| 2017/0103489 A1* | 4/2017 | Asad ................ H04L 63/107 |
| 2017/0142684 A1 | 5/2017 | Bhatt et al. |
| 2017/0160375 A1 | 6/2017 | Syrjarinne et al. |
| 2017/0238146 A1 | 8/2017 | Kulig et al. |
| 2017/0311165 A1 | 10/2017 | Kang et al. |
| 2017/0325070 A1 | 11/2017 | Wirola et al. |
| 2017/0343639 A1 | 11/2017 | Ivanov et al. |
| 2017/0343640 A1 | 11/2017 | Khan et al. |
| 2018/0007067 A1 | 1/2018 | Kaushik |
| 2018/0067187 A1 | 3/2018 | Oh et al. |
| 2018/0070239 A1 | 3/2018 | Norrman et al. |
| 2018/0113189 A1 | 4/2018 | Khan et al. |
| 2018/0123708 A1 | 5/2018 | Khalajmehrabadi et al. |
| 2018/0188348 A1 | 7/2018 | Wirola et al. |
| 2018/0219869 A1 | 8/2018 | Kumar et al. |
| 2018/0255430 A1 | 9/2018 | Ivanov et al. |
| 2018/0279067 A1 | 9/2018 | Ivanov et al. |
| 2018/0332558 A1 | 11/2018 | Chan et al. |
| 2018/0352585 A1 | 12/2018 | Yang et al. |
| 2019/0036951 A1 | 1/2019 | Kim |
| 2019/0150001 A1 | 5/2019 | Jen et al. |
| 2019/0174452 A1 | 6/2019 | Lev et al. |
| 2019/0340363 A1 | 11/2019 | Walrant |
| 2020/0015096 A1 | 1/2020 | Wirola et al. |
| 2020/0036590 A1 | 1/2020 | Camarillo Gonzalez et al. |
| 2020/0112570 A1 | 4/2020 | Yang et al. |
| 2020/0200856 A1 | 6/2020 | Wirola et al. |
| 2020/0200857 A1 | 6/2020 | Wirola et al. |
| 2020/0200858 A1 | 6/2020 | Wirola et al. |
| 2020/0200859 A1 | 6/2020 | Wirola et al. |
| 2020/0200864 A1 | 6/2020 | Wirola et al. |
| 2020/0200865 A1 | 6/2020 | Wirola et al. |

(56) References Cited

U.S. PATENT DOCUMENTS

| | | |
|---|---|---|
| 2020/0205004 A1 | 6/2020 | Wirola et al. |
| 2020/0205005 A1 | 6/2020 | Wirola et al. |

FOREIGN PATENT DOCUMENTS

| | | |
|---|---|---|
| EP | 3 076 582 A1 | 10/2016 |
| EP | 3 410 156 A1 | 12/2018 |
| WO | WO 2015/189161 A1 | 12/2015 |
| WO | WO 2017/100686 A1 | 6/2017 |

OTHER PUBLICATIONS

Non-Final Office Action for U.S. Appl. No. 16/723,768 dated Jun. 9, 2021.
Wirola et al., "Bandwidth and Storage Reduction of Radio Maps for Offline WLAN Positioning", 2013 International Conference on Indoor Positioning and Indoor Navigation, (Oct. 28-31, 2013), 9 pages.
Notice of Allowance for U.S. Appl. No. 16/723,572 dated Jul. 13, 2021.
Advisory Action for U.S. Appl. No. 16/723,451 dated Jul. 15, 2021.
Office Action for U.S. Appl. No. 16/723,802 dated May 18, 2020.
Office Action for U.S. Appl. No. 16/723,662 dated Jul. 9, 2020.
Office Action for U.S. Appl. No. 16/723,572 dated Jul. 7, 2020.
Office Action for U.S. Appl. No. 16/723,721 dated Jul. 1, 2020.
Extended European Search Report for Application No. EP 18214714.0 dated Jul. 5, 2019, 6 pages.
Office Action for European Application No. 18214718.1 dated Jul. 14, 2021, 9 pages.
Office Action for European Application No. 18214724.9 dated Jun. 30, 2021, 8 pages.
Advisory Action for U.S. Appl. No. 16/723,662 dated Mar. 22, 2021.
Non-Final Office Action for U.S. Appl. No. 16/723,572 dated Mar. 22, 2021.
Non-Final Office Action for U.S. Appl. No. 16/723,620 dated Mar. 25, 2021.
Advisory Action for U.S. Appl. No. 16/723,662 dated Jan. 7, 2022.
Final Office Action for U.S. Appl. No. 16/723,451 dated Jan. 24, 2022.
Non-Final Office Action for U.S. Appl. No. 16/723,451 dated Sep. 7, 2021.
Office Action for European Application No. 18214688.6 dated Aug. 25, 2021, 4 pages.
Office Action for European Application No. 18214694.4 dated Aug. 27, 2021, 4 pages.
Final Office Action for U.S. Appl. No. 16/723,620 dated Sep. 29, 2021.
Final Office Action for U.S. Appl. No. 16/723,662 dated Oct. 15, 2021.
Final Office Action for U.S. Appl. No. 16/723,768 dated Nov. 1, 2021.
Notice of Allowance for U.S. Appl. No. 16/723,768 dated Nov. 22, 2021.
Advisory Action for U.S. Appl. No. 16/723,620 dated Dec. 10, 2021.
Final Office Action for U.S. Appl. No. 16/723,662 dated Dec. 18, 2020.
Final Office Action for U.S. Appl. No. 16/723,572 dated Dec. 8, 2020.
Office Action for European Application No. 18214716.5 dated Feb. 5, 2021, 5 pages.
Notice of Allowance for U.S. Appl. No. 16/723,721 dated Nov. 16, 2020.
Notice of Allowance for U.S. Appl. No. 16/723,802 dated Nov. 6, 2020.
Non-Final Office Action for U.S. Appl. No. 16/723,451 dated Nov. 23, 2020.
Non-Final Office Action for U.S. Appl. No. 16/723,662 dated May 7, 2021.
Final Office Action for U.S. Appl. No. 16/723,451 dated May 3, 2021.
Extended European Search Report for Application No. EP 18 21 4716 dated Jul. 5, 2019, 6 pages.
Extended European Search Report for Application No. EP 18 21 4721 dated Jul. 22, 2019, 7 pages.
Extended European Search Report for Application No. EP 18 21 4705 dated Jul. 5, 2019, 8 pages.
Extended European Search Report for Application No. EP 18 21 4688 dated Jul. 9, 2019, 6 pages.
Extended European Search Report for Application No. EP 18 21 4718 dated Jun. 17, 2019, 9 pages.
Extended European Search Report for Application No. EP 18 21 4720 dated Jul. 15, 2019, 8 pages.
Extended European Search Report for Application No. EP 18 21 4694 dated Jul. 5, 2019, 6 pages.
Extended European Search Report for Application No. EP 18 21 4724 dated Jul. 12, 2019, 9 pages.
U.S. Appl. No. 16/723,451, filed Dec. 20, 2019; In re: Wirola et al. entitled *Service for Real-Time Spoofing/Jamming/Meaconing Warning*.
U.S. Appl. No. 16/723,572, filed Dec. 20, 2019; In re: Wirola et al. entitled *Statistical Analysis of Mismatches for Spoofing Detection*.
U.S. Appl. No. 16/723,620, filed Dec. 20, 2019; In re: Wirola et al. entitled *Crowd-Sourcing of Potentially Manipulated Radio Signals and/or Radio Signal Parameters*.
U.S. Appl. No. 16/723,662, filed Dec. 20, 2019; In re: Wirola et al. entitled *Device-Centric Learning of Manipulated Positioning*.
U.S. Appl. No. 16/723,721, filed Dec. 20, 2019; In re: Wirola et al. entitled *Identifying Potentially Manipulated Radio signals and/or Radio Signal Parameters Based on a First Radio Map Information and a Second Radio Map Information*.
U.S. Appl. No. 16/723,768, filed Dec. 20, 2019; In re: Wirola et al. entitled *Identifying Potentially Manipulated Radio signals and/or Radio Signal Parameters Based on Radio Map Information*.
U.S. Appl. No. 16/723,802, filed Dec. 20, 2019; In re: Wirola et al. entitled *Identifying Potentially Manipulated Radio Signals and/or Radio Signal Parameters*.
GPS Spoofing A Growing Problem for Uber [online] [retrieved Feb. 17, 2020]. Retrieved via the Internet: https:/soliddriver.com/GPS-Spoofing-A-Growing-Problem-for-Uber (dated Nov. 10, 2019) 4 pages.
Galileo Commercial Service Implementing Decision enters into force Uber [online] [retrieved Feb. 17, 2020]. Retrieved via the Internet: https:/www.gsa.europa.eu/newsroom/news/galileo-commercial-service-implementing-decision-enters-force (dated Feb. 10, 2017) 6 pages.
Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.
Android keystore system | Android Developers [online] [retrieved Feb. 17, 2020]. Retrieved via the Internet: https://web.archive.org/web/20181212204557/https://developer.android.com/training/articles/keystore (dated Dec. 12, 2018) 17 pages.
Subscriber Identity Module—Wikipedia [online] [retrieved Feb. 17, 2020]. Retrieved via the Internet: https://web.archive.org/web/20170923162233/https://fi.wikipedia.org/wiki/Subscriber_Identity_Module (dated Sep. 23, 2017) 2 pages.
Extensible Authentication Protocol—Wikipedia [online] [retrieved Feb. 17, 2020]. Retrieved via the Internet: https://web.archive.org/web/20171209152957/https://en.wikipedia.org/wiki/Extensible_Authentication_Protocol (dated Dec. 9, 2017) 10 pages.
Arkko, J. et al., *Extensible Authentication Protocol Method for 3rd Generation Authentication and Key Agreement (EAP-AKA)*, RFC4187 (Jan. 2006) 80 pages.
Tang, Z. et al., *Exploiting Wireless Received Signal Strength Indicators to Detect Evil-Twin Attacks in Smart Homes*, Hindawi, Mobile Information systems, vol. 2017, Article ID 1248578 (Jan. 2017) 14 pages.

(56) References Cited

OTHER PUBLICATIONS

Enterprise Mobility 8.1 Design Guide—WLAN RF Design Consideration [Cisco 5500 Series Wireless Controllers]—Cisco [online] [retrieved Feb. 25, 2020]. Retrieved via the Internet: https://web.archive.org/web/20170801042321/https://www.cisco.com/c/en/us/td/docs/wireless/controller/8-1/Enterprise-Mobility-8-1-Design-Guide/Enterprise_Mobility_8-1_Deployment_Guide/wlanrf.html (dated Aug. 1, 2017) 46 pages.
Notice of Allowance for U.S. Appl. No. 16/723,662 dated Apr. 1, 2022.
Advisory Action for U.S. Appl. No. 16/723,451 dated Apr. 7, 2022.
Notice of Allowance for U.S. Appl. No. 16/723,620 dated Feb. 24, 2022.
Office Action for European Application No. 18214721.5 dated May 4, 2022, 6 pages.
Office Action for European Application No. 18214720.7 dated May 4, 2022, 5 pages.
Notice of Allowance for U.S. Appl. No. 16/723,451 dated Jun. 20, 2022.
Office Action for European Application No. 18214705.8 dated Jun. 30, 2022, 6 pages.

* cited by examiner

ENABLING FLEXIBLE PROVISION OF SIGNATURE DATA OF POSITION DATA REPRESENTING AN ESTIMATED POSITION

CROSS-REFERENCE TO RELATED APPLICATIONS

This application claims priority to European Application No. 18214721.5, filed Dec. 20, 2018, the entire contents of which are incorporated herein by reference.

FIELD OF THE DISCLOSURE

The invention relates to the field of radio positioning and more specifically to enable flexible provision of signature data of position data representing an estimated position (e.g. to one or more application programs).

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudo-lites, which are ground based GPS-like short-range beacons, ultra-sound positioning systems, Bluetooth low energy (BLE) based positioning systems, cellular network based positioning systems and wireless local area network (WLAN) based positioning systems.

Such a non-GNSS based radio positioning system (e.g. a self-contained positioning system) may be divided in at least three stages, an installation stage, a training stage and a positioning stage.

In the installation stage, dedicated positioning support radio devices (e.g. Bluetooth beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio devices (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EMBODIMENTS OF THE INVENTION

Radio positioning systems like non GNSS-based radio positioning systems (e.g. Bluetooth, WLAN and cellular based radio positioning systems) as disclosed above may be affected by manipulating radio signals that are used for positioning purposes during the positioning stage. Manipulation techniques may for example be spoofing or jamming of such radio signals:

Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic radio signals captured at a different position and/or time. Alternatively, a spoofing malware running on the mobile device may falsify scanning results (e.g. as scanning results obtained radio signal parameters) when the mobile device scans for observable radio signals for estimating its position. Such falsified (i.e. "spoofed") radio signals or scanning results may be used to cause the mobile device to determine its position to be somewhere other than where it actually is.

Jamming of radio signals may be considered to relate a deliberate attempt to disrupt scanning for one or more radio signals by a mobile device, for example by transmitting radio signals and/or radio noise interfering the one or more radio signals.

Such manipulation techniques are a threat to business models which rely on trustworthy positioning like car sharing services. It is inter-alia an object of the present invention to improve radio positioning systems like the above disclosed non-GNSS based radio positioning systems to enable mitigating the threat associated with such manipulation techniques.

According to an exemplary aspect of the invention, a method is disclosed, wherein the method is performed by a mobile device at least partially under control of a positioning program, the method comprising:

establishing or initiating establishing a secure communication path to a remote device for receiving one or more signature parameter data sets;

receiving the one or more signature parameter data sets via the secure communication path from the remote device;

estimating a position of the mobile device at least partially based on one or more radio signal parameters obtained by the mobile device, wherein position data representing the estimated position of the mobile device are obtained as a result of the estimating;

determining a digital signature of the position data at least partially based on at least one of the one or more signature parameter data sets, wherein signature data representing the digital signature of the position data are obtained as a result of the determining;

providing the position data and the signature data to one or more application programs.

The disclosed method may serve for enabling flexible provision of signature data of position data representing an estimated position (e.g. to one or more application programs).

The mobile device may be an Internet-of-Thing (IoT) device, a smart home device, a smartphone, a tablet computer, a notebook computer, a smart watch, and a smart band. For example, the mobile device may be one of the below disclosed mobile devices.

For example, the disclosed method may be part of or support a radio positioning system like a non-GNSS based radio positioning system as disclosed above. It is however to be understood that the present invention is not limited to non-GNSS based radio position system and may be applied to a GNSS-based radio positioning systems like GPS or Galileo as well.

The mobile device may be enabled for or support such a radio positioning system. This may be understood to mean that the mobile device is configured to estimate (e.g. determine) its position at least partially based on radio signal parameters of one or more radio signals (e.g. one or more satellite radio signals of a GNSS based radio signal or one or more terrestrial radio signals of a non-GNSS based radio signal) obtained by the mobile device at this position (e.g. obtained as a scanning result of scanning for observable radio signals at this position). For example, the computer program code representing the positioning program may contain and/or represent instructions for estimating (e.g. determining) the mobile device's position at least partially based on radio signal parameters of one or more radio signals obtained by the mobile device at this position.

The method may be understood to be performed at least partially under control of the positioning program, when the positioning program runs on the mobile device and causes the mobile device to perform one or more (e.g. all steps) of the disclosed method. All steps caused by the positioning program running on the mobile device are for example to be understood to be performed under control of the positioning program. To this end, the positioning program may be represented by computer program code which causes the mobile device, when executed by a processor (or by a plurality of processors) to perform one or more (e.g. all) steps of the disclosed method. Accordingly, the positioning program may be considered to run on the mobile device, when such a computer program code representing the positioning program is executed by a processor (or by a plurality of processors) of the mobile device, and causes the mobile device to perform one or more (e.g. all) steps of the disclosed method. For example, the computer program code representing the positioning program may be the below disclosed computer program code of a positioning program for a mobile device (e.g. the below disclosed computer program code stored in a non-transitory computer readable storage medium).

When the positioning program runs on the mobile device, it may for example provide certain positioning-related services to other programs running on the mobile device, for example the one or more application programs. In particular, the positioning program may serve for estimating the position of the mobile device and for providing position data representing the estimated position to other programs of the mobile device. The positioning program may for example communicate with other programs (e.g. the operating system and/or the application programs) running on the mobile device by means of one or more programming interfaces or services, for example by providing data to such other programs and/or by obtaining data from such other programs by means of one or more programming interfaces or services. Therein, data may be understood (1) to be, (2) to contain and/or (3) to represent information (e.g. coded information) like radio map information, position coordinates of an estimated position or radio signal parameters.

The remote device is a device remote from the mobile device. For example, the remote device is a server. In particular, the remote device may be at least one of (1) a server of the distributor of the positioning program, (2) a key server (e.g. of the distributor of the positioning program) and (3) a positioning server (e.g. a positioning server of the radio positioning system).

The communication path to the remote device may be understood to be a communication path between the mobile device and the remote device enabling communication (e.g. receiving or transmitting of data) between them. For example, the mobile device may receive data from the remote device via the communication path and transmit data to the remote device via the communication path. For example, the communication path may include one or more communication links (e.g. one or more communication connections) over one or more communication networks. Such a communication network may be (1) a cellular communication network like a 2G/3G/4G/5G cellular communication network, (2) a local area network (LAN), (3) a wireless LAN (WLAN), (4) a virtual private network (VPN) or (5) the Internet, to name a few non limiting examples. The 2G/3G/4G/5G cellular radio communication standards are developed by the 3GPP and presently available under http://www.3gpp.org/. An example of a LAN is an Ethernet as specified by the standards of the IEEE 802.3 family (http://www.ieee.org/). WLAN is for example specified by the standards of the IEEE 802.11 family (http://www.ieee.org/). A Framework for IP Based VPNs is for example specified in RFC2764 of the Internet Engineering Task Force (IETF) presently available under https://tools.ietf.org/.

Establishing the communication path to the remote device may be understood to mean that the mobile device and the remote device cooperate to establish the communication path, for example request data representing a request for establishing the communication path and response data representing a response to the request are exchanged between the mobile device and the remote device, for example according to a communication protocol (e.g. for negotiating one or more communication parameters for communication over the communication path). Example of such a communication protocol are (1) the Secure Sockets Layer (SSL) Protocol Version 3.0 as specified in RFC6101 of the IETF (https://tools.ietf.org/) or the Transport Layer Security (TLS) Protocol Version 1.2 as specified in RFC5246 of the IETF (https://tools.ietf.org/). Accordingly, the secure communication path may be a SSL connection or a TLS connection, for example an SSL connection or a TLS connection over the Internet. A SSL or TSL connection may be understood to be established by performing a SSL or TSL handshake. For example, the mobile device may initiate the establishing the communication path to the remote device by transmitting a request (e.g. a "client hello message" according to the SSL or TLS protocol) for establishing the communication path to the remote device.

That the communication path to the remote device is secure may be understood to mean at least one of the following: (1) only authenticated entities (e.g. the remote device and/or the mobile device) can communicate over the communication path and (2) the communication via the communication path is at least partially encrypted. Accordingly, establishing the secure communication path to the remote device may comprise at least one of the following: (1) authentication of at least one of the mobile device and the remote device and (2) negotiating encryption parameters (e.g. exchanging encryption and/or decryption keys).

Receiving the one or more signature parameter data sets via the secure communication path from the remote device may be understood to mean that the one or more signature parameter data sets are only received if the secure communication path to the remote device is/has been established.

For example, the steps of establishing or initiating establishing a secure communication path and, optionally, receiving the one or more signature parameter data sets may be performed during or immediately after installation of the positioning program on the mobile device. If the positioning program is preinstalled on the mobile device, they may be performed during or immediately after the first boot of the mobile device or during the first execution of the position program. Performing this/these step(s) as early as possible may have the effect that the risk of an attack (e.g. by a malware running on the mobile device) on the establishing the secure communication path is as low as possible.

Estimating (e.g. determining) of a position of the mobile device at least partially based on obtained radio signal parameter(s) may be understood to mean that the estimating is performed as a function of the obtained radio signal parameter(s).

A radio signal parameter of a certain radio signal may for example be obtained by the mobile device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, the mobile device may determine at least one respective radio signal parameter for one or more (e.g. each) radio signal observed when scanning for radio signals at a certain position. The determined radio signal parameters may then for example be obtained as scanning results.

A radio signal parameter of a certain radio signal may be understood to be at least one of (1) an information like a radio positioning support information contained in or represented by the radio signal and (2) a representation (e.g. an indicator or a value) of a physical quantity (e.g. a received signal strengths) of the radio signal. Accordingly, a radio signal parameter may be determined by at least one of (1) extracting information contained in or represented by the radio signal and (2) measuring a physical quantity of the radio signal. An example of an information contained in or represented by a radio signal is a radio positioning support information enabling the mobile device alone or in combination with further information to estimate its position. A radio positioning support information may for example be a pseudorandom code and/or a message contained in or represented by a satellite radio signal of a GNSS based radio positioning system or an identifier contained in or represented by a terrestrial radio signal of a non-GNSS based radio positioning system. Example of a representation of a physical quantity of a radio signal are (1) a received signal strength indicator (RSSI), (2) a received signal strength value, (3) a time-of-arrival (TOA) value, (4) a time-of-flight (TOF) value and (5) an angle-of-arrival (AOA).

For example, the position may be estimated by (1) triangulation at least partially based on AOA values of one or more (e.g. at least three) observed radio signals and/or (2) by trilateration or multilateration at least partially based on RSSIs or TOF values of one or more (e.g. at least three) observed radio signals and/or by determining a GNSS position at least partially based on radio positioning support information extracted from one or more observed radio signals. It is however to be understood that the estimating may optionally depend on further information like GNSS assist data of a GNSS based radio position system or a radio map of a non-GNSS based radio positioning system as disclosed above.

GNSS assist data is for example A-GPS (assistance GPS) data provided by an A-GPS server.

A radio map of a non-GNSS based radio positioning system may be configured to enable mobile devices to estimate their position at least partially based on this radio map when the mobile devices are located in the area covered by the radio map. For example, the radio map is represented by radio map information which may be provided (e.g. transmitted) by a positioning server to the mobile device and/or which may be held available by the mobile device (e.g. stored in memory means of the mobile device(s)). For example, the radio map contains or represents a respective radio model for a plurality of radio devices transmitting (e.g. broadcasting) radio signals that are observable within the area covered by the radio map. If the radio map covers a building, the radio map may contain or represent, for each floor of the building, a respective radio model for a plurality of radio devices transmitting (e.g. broadcasting) radio signals that are observable on the respective floor of the building. A radio model may represent an expected two-dimensional or three-dimensional radio coverage of a radio device. It may describe (e.g. define) the expected radio coverage area (e.g. on a certain floor of a building) of a radio device within which one or more radio signal parameters indicative of one or more radio signals transmitted by the radio device are expected to be observable. The real radio coverage of the radio device may however deviate from such an expected radio coverage. A radio model may be a hard-boundary model like a geometric radio model or a soft-boundary model like a parametric radio model or a radio image model. As disclosed above, the radio map may be determined by the positioning server during the training stage of the non-GNSS based radio positioning system.

As a result of estimating a position of the mobile device position data representing the estimated position of the mobile device may be obtained. For example, the position data contain or represent position coordinates of the estimated position like latitude and longitude and, optionally, altitude, of the estimated position.

The digital signature may be determined by use of (e.g. according to) a digital signature algorithm. Input parameters of such an algorithm may the position data or a hash value of the position data. A hash value of the position data may be obtained by use of (e.g. according to) a cryptography hash algorithm receiving the position data as input parameter. For example, the computer program code representing the positioning program may contain and/or represent instructions for determining the digital signature of the position data according to the digital signature algorithm and/or the cryptography hash algorithm. Furthermore, each of the one or more signature parameter data sets may contain or represent input parameters for such a digital signature algorithm for determining the digital signature like a private key (e.g. a private key of an asymmetric cryptography key pair). If the digital signature is determined according to such a digital signature algorithm receiving such input parameters, the digital signature may be understood to be determined at least partially based on such input parameters.

For example, for each of the one or more signature parameter data sets, a respective digital signature may be determined by using the respective input parameters represented by or contained in the respective signature parameter data set as input parameters to the digital signature algorithm. Accordingly, in case of more than one signature parameter data sets (e.g. in case of the at least two individual signature parameter data sets as disclosed below), more than one different digital signatures of the position data may be determined. In this case, for each of the different digital signatures, respective individual signature data representing the respective digital signature may be obtained as a result of the determining.

Non-limiting examples for a digital signature algorithm for determining the digital signature are (1) the Digital Signature Algorithm (DSA) as specified in a FIPS186 (e.g. FIPS186-4) standard by the National Institute of Standards and Technology (NIST) (https://csrc.nist.gov) and (2) the Rivest-Shamir-Adleman (RSA) algorithm as specified in PKCS #1 presently available as RFC8017 from the Internet Engineering Task Force (IETF) (https://tools.ietf.org/). As a result of determining a digital signature of the position data signature data representing the determined digital signature of the position data may be obtained.

Examples of cryptography hash algorithms are (1) Secure Hash Algorithm 1 (SHA-1) or the Secure Hash Algorithm 2 (SHA-2) family as specified in FIPS180 standards by the NIST, (2) Secure Hash Algorithm 3 (SHA-3) as specified in FIPS202 standard by the NIST or (3) the MD5 Message-Digest Algorithm (MD5) as specified in RFC1321 and RFC6151 presently available from the IETF.

The digital signature of the position data may enable an entity (e.g. the one or more application programs) receiving the position data and the digital signature (or digital signature data representing the digital signature) to verify the authenticity and/or integrity of the position data. Therein, verifying the authenticity and/or integrity of the position data may be understood to mean that it is checked whether or not the digital signature is valid for the position data (i.e. a valid digital signature of the position data). If it is confirmed that the digital signature is valid for the position data (i.e. a valid digital signature of the position data), the authenticity and/or integrity of the position data may be considered to be verified.

Verifying the authenticity and/or integrity of the position data may be performed by use of (e.g. according to) a digital signature algorithm and/or a cryptography hash algorithm (e.g. the algorithm(s) used for determining the digital signature or (an) algorithm(s) corresponding to the algorithm(s) used for determining the digital signature). For example, the digital signature algorithm and/or the cryptography hash algorithm may be used to confirm that the digital signature is valid for the position data (i.e. is a digital signature of the position data). To this end, the digital signature algorithm and/or the cryptography hash algorithm may receive the position data and the digital signature (or signature data representing the digital signature) as input parameter. Furthermore, each of the one or more signature parameter data sets may contain or represent input parameters for such a digital signature algorithm for verifying the digital signature like a public key (e.g. a public key of an asymmetric cryptography key pair).

If the authenticity and/or integrity of the position data is not verified or verifiable (e.g. because the digital signature is not valid for the position data), the position data may be considered to be potentially manipulated (i.e. recognized as potentially manipulated).

The one or more application programs may be understood to be application programs of the mobile device. Accordingly, providing the position data and the signature data to the one or more application programs may be understood to mean that the position data and the signature data are provided such that they are receivable by (e.g. retrievable by) the application programs, for example by means of a programming interface or a service (e.g. being part of or defined by an operating system of the mobile device). Therein, the signature data may be understood to represent at least one digital signature of the position data. Accordingly, in case more than one individual digital signatures of the position data are determined, the position data may be individual signature data representing an individual digital signature of the more than one individual digital signatures.

The application programs may for example be part of a higher software layer of a software architecture of the mobile device than the positioning program. For example, the application programs are part of the application layer; and the positioning program may for example be part of a lower software layer which provides services to application programs of the application layer (e.g. an operating system layer or a service layer). For example, the positioning program is one of a middleware, a firmware or part of the operating system of the mobile device. Alternatively, the application programs and the positioning program may be part of the same software layer of a software architecture of the mobile device.

It is however to be understood that the invention is not limited to embodiments where the application programs and the positioning program are programs of the mobile device. Alternatively, at least one of the one or more application programs may be an application program of the remote device and/or the positioning server. In this case, providing the position data and the signature data to this application program may be understood to mean that the position data and the signature data are transmitted by the mobile device to the remote device such that they are receivable by this application program, for example by means of a network interface of the mobile device.

Non-limiting exemplary operating systems of the mobile device are the iOS operating system and the Android operating system. Accordingly, a program of the mobile device like the positioning program and/or the application programs may be an app for execution in iOS or Android. Computer program code of a program for execution in iOS may be contained in or represented by an iOS App Store Package file having the .ipa filename extension; and computer program code of a program for execution in Android may be contained in or represented by an Android application package having the .apk filename extension. Ipa-files and apk-files are used for distributing and installing iOS apps and Android apps, respectively. The Android operating system is developed by Google primarily for touchscreen mobile devices and based on a modified version of the Linux kernel. A documentation of the Android operating system for app developers is presently available under: https://developer.android.com/. The iOS operating system is developed by Apple Inc. exclusively for its mobile devices like the iPhone, iPad, and iPod Touch. A documentation of the iOS operating system for app developers is presently available under: https://developer.apple.com/ios/.

By providing the position data together with the signature data to the one or more application programs, the applications programs are enabled to verify the authenticity and/or integrity of the position data. If the position data provided by the positioning program are intercepted and manipulated by a malware, they will thus be identified or recognized by the application program as potentially manipulated.

Moreover, by way of the secure communication path, it is possible to update the one or more signature parameter data sets, for example to add one or more new signature parameter data sets or to revoke one or more signature parameter data sets. For example, different application programs may subscribe for provision of signature data representing a digital signature of the position data. For each of these different application programs an individual signature parameter data set may be received via the secure communication path. If one of these applications now unsubscribes from the provision of signature data representing a digital signature of the position data, the individual signature parameter data set for this application program may be revoked without affecting the other application programs. The present invention thus enables a flexible provision of signature data of position data representing an estimated position.

According to a further exemplary aspect of the invention, a mobile device is disclosed, wherein the mobile device comprises means for performing the steps of any one embodiment of the disclosed method or a part thereof (e.g. at least some steps of any one embodiment of the disclosed method).

The means of the disclosed mobile device can be implemented in hardware and/or software. They may comprise for instance a processor for executing computer program code (e.g. computer program code of a positioning program for a mobile device as disclosed below) for realizing the required functions, a memory storing the computer program code, or both. Alternatively, they could comprise for instance circuitry that is designed to realize the required functions, for instance implemented in a chipset or a chip, like an integrated circuit. The disclosed mobile device may comprise a single means for all functions, a common plurality of means for all functions, or a plurality of different means for different functions.

According to a further exemplary aspect of the invention, a mobile device is disclosed, wherein the mobile device comprises at least one processor and at least one memory containing computer program code (e.g. computer program code of a positioning program for a mobile device as disclosed below), the at least one memory and the computer program code with the at least one processor configured to cause the mobile device at least to perform any one embodiment of the disclosed method (e.g. the steps of any one embodiment of the disclosed method) or a part thereof (e.g. at least some steps of any one embodiment of the disclosed method).

For example, the disclosed mobile device(s) may be (a) module(s) or component(s) for (a) mobile device (s), for example (a) chip(s) or chipset(s). Alternatively, the disclosed mobile device(es) may be (a) mobile device(s). The mobile device may be configured for determining its position based on a non-GNSS based radio positioning system as disclosed above, for example a Bluetooth, WLAN, LPWAN or cellular based radio positioning system or a combination thereof.

It is to be understood that the disclosed mobile device(s) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a radio positioning system is disclosed which comprises at least one of the disclosed mobile device(s) and a remote device.

As disclosed above, the remote device is a device remote from the mobile device. For example, the remote device is a server. In particular, the remote device may be a server of the distributor of the positioning program and/or for distributing the positioning program to mobile devices and/or a positioning server of the radio positioning system.

For example, the remote device is configured to establish the secure communication path (e.g. together with the mobile device) and to transmit the one or more signature parameter data sets via the secure communication path to the mobile device.

The remote device may be part of a plurality of servers (e.g. forming a server cloud) or may be represented by such a plurality of servers (e.g. forming server cloud).

Optionally, the radio positioning system may further comprise a positioning server and/or one or more radio devices transmitting (e.g. broadcasting) one or more radio signals.

According to a further exemplary aspect of the invention, a non-transitory computer readable storage medium is disclosed, in which computer program code (e.g. computer program code of a positioning program for a mobile device as disclosed below) is stored. The computer program code causes a mobile device to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of the device, or be intended for distribution of the computer program code, like an optical disc.

According to a further exemplary aspect of the invention, a computer program code of a positioning program for a mobile device is disclosed, the computer program code when executed by a processor (or by a plurality of processors) causing an mobile device to perform any one embodiment of the disclosed method (e.g. the steps of any one embodiment of the disclosed method).

The disclosed method, mobile device(s), system, non-transitory computer readable storage medium and computer program code may be for enabling flexible provision of signature data of position data representing an estimated position (e.g. to one or more application programs).

In the following, further features and embodiments of these exemplary aspects of the invention will be described.

According to an exemplary embodiment of the invention, each of the signature parameter data sets contains or represents at least one of:
- a private key or a public key;
- one or more further input parameters for a digital signature algorithm;
- a digital signature algorithm or an identification of a digital signature algorithm;
- a cryptography hash algorithm or an identification of a cryptography hash algorithm.

As disclosed above, each of the one or more signature parameter data sets may contain or represent input parameters for the digital signature algorithm which is used for determining and/or verifying the digital signature. Examples of such input parameters for the digital signature algorithm are (1) a private key (e.g. for determining a digital signature) and (2) a public key (e.g. for verifying a digital signature). The private key and/or the public key may be part of the same asymmetric cryptography key pair, for example a DSA or RSA key pair. An example for one or more further input parameters for the digital signature algorithm are domain parameters, for example DSA domain parameters (i.e. p, q and g).

Moreover, each of the signature parameter data sets may represent or contain the digital signature algorithm and/or the cryptography hash algorithm that is/are to be used for determining and/or verifying the digital signature. This is for example to be understood to mean that the signature parameter data sets represent and/or contain computer program code representing instructions for determining and/or verifying the digital signature by use of the digital signature algorithm and/or the cryptography hash algorithm. For example, the positioning program, when running on the mobile device, may cause execution of this computer program code for determining and/or verifying the digital signature.

Alternatively or additionally, each of the signature parameter data sets may represent or contain an identification of the digital signature algorithm and/or the cryptography hash algorithm that is/are to be used for determining and/or verifying the digital signature. For example, the positioning program, when running on the mobile device, may cause that the digital signature is determined and/or verified by use of the algorithm(s) identified by this identification/these identifications.

It is to be understood that each of the signature parameter data sets may comprise at least one of (1) a private portion, (2) a public portion or (3) both a public portion and a private portion. The public portion may for example contain and/or represent information (e.g. computer program code representing the algorithm(s) and/or an identification of the algorithm(s) used for both determining and verifying the digital signature) and input parameters for the digital signature algorithm (e.g. domain parameters) that are necessary for both determining and verifying the digital signature as well as all information (e.g. computer program code representing the algorithm(s) and/or an identification of the algorithm(s) used for verifying the digital signature) and input parameters (e.g. the public key) that are necessary for verifying the digital signature. The private portion may for example contain and/or represent information (e.g. computer program code representing the algorithm(s) and/or an identification of the algorithm(s) used for determining the digital signature) and input parameters (e.g. the private key) that are only necessary for determining the digital signature. For example, the private portion may be (e.g. only) accessible by the positioning program; and the public portion may be accessible by the positioning program and at least one application program of the one or more application programs.

According to an exemplary embodiment of the invention, the method further comprises:
- storing the one or more signature parameter data sets at least partially in a secure storage of the mobile device accessible by the positioning program.

The secure storage may be understood to be a data container (e.g. a file or a database) or to be part of a memory area which is accessible by the positioning program. To this end, the secure storage may be only accessible by programs and/or users that have been granted access rights for accessing (e.g. reading and/or writing) this memory area. Accordingly, the positioning program may be considered to have at access to the one or more signature parameter data sets if it has access rights for accessing (e.g. reading and/or writing) the one or more signature parameter data sets or the secure storage storing the private key. For example, only the positioning program may have access rights for accessing (e.g. reading and/or writing) the one or more signature parameter data sets or accessing the secure storage storing the one or more signature parameter data sets.

As disclosed above, each of the signature parameter data sets may comprise a private portion and a public portion. In this case, the positioning program may for example have access rights for accessing (e.g. reading and/or writing) the private portions and the public portions of each of the one or more signature parameter data sets or accessing the secure storage storing the private key; whereas each of the one or more applications programs may for example have access rights for accessing (e.g. reading and/or writing) the public portion of at least one of the one or more signature parameter data sets (e.g. the individual signature parameter data set of the at least two individual signature parameter data sets received for the respective one of the one or more applications programs as disclosed below) or accessing the secure storage storing the public portion of at least one of the one or more signature parameter data sets.

Such a secure storage may be managed and/or protected by the operating system of the mobile device. Examples of functionalities of operating systems managing and/or protecting such a secure storage are (1) the keystore-service of the Android operating system or (2) the keychain-service of the iOS operating system.

According to an exemplary embodiment of the invention, the establishing the secure communication path involves at least one of:
- mutual authentication of the mobile device and the remote device;
- key exchange between the mobile device and the remote device;
- Transport Layer Security protocol;
- Secure Sockets Layer protocol;
- Extensible Authentication Protocol.

Mutual authentication of the mobile device and the remote device may be understood to mean that the remote device authenticates the mobile device and the mobile device authenticates the remote device when establishing the secure communication path. The mutual authentication of the mobile device and the remote device may be performed according to a communication protocol like the SSL or TLS protocol. For example, the mobile device may transmit client authentication data to the remote device (e.g. as part of a client certificate message according to the SSL or TLS protocol) and receive server authentication data from the remote device (e.g. as part of a server certificate message according to the SSL or TSL protocol). The client authentication data may represent or contain authentication information enabling the remote device to authenticate the mobile device (e.g. to determine that the mobile device is permitted to receive the one or more signature parameter data sets via the secure communication path). Likewise, the server authentication data may represent or contain authentication information enabling the mobile device to authenticate the remote device (e.g. to determine that receiving the one or more signature parameter data sets via the secure communication path from the remote device is permitted). Each of the server authentication data and the client authentication data may represent or contain a respective certificate. Examples of such certificates are (1) X.509 certificates as specified in RFC5208 of the IETF (https://tools.ietf.org/), for example a server certificate and a client certificate according to the SSL or TSL protocol which are X.509 certificates or modified X.509 certificates. By mutual authentication of the mobile device and the remote device, it may thus be prevented that the secure communication path is established between or to (an) unknown (e.g. untrustworthy) device(s).

Key exchange between the mobile device and the remote device may be understood to mean that one or more keys for encrypting and/or decrypting the communication via the secure communication path are exchanged between the mobile device and the remote device. It is to be understood that the one or more keys may be one of (1) one or more symmetric keys (e.g. secret keys), (2) one or more asymmetric keys (e.g. public and/or private keys of one or more asymmetric key pairs) and (3) a combination thereof. The key exchange between the mobile device and the remote device may be performed according to a communication protocol like the SSL or TLS protocol. By the key exchange between the mobile device and the remote device, the mobile device and the remote device are for example enabled to encrypt (e.g. symmetrically or asymmetrically encrypted) the outgoing communication via the secure communication path and to decrypt (e.g. symmetrically or asymmetrically encrypted) the incoming communication via the secure communication path. The entire communication via the secure communication path may thus be encrypted. Accordingly, a third entity (not knowing the exchanged keys) may not be able to monitor the communication via the secure communication path.

The key exchange may be performed over the same communication channel via which the secure communication path is established or the key exchange may be performed at least partially via a different communication channel than the communication channel via which the secure communication path is established. Therein, a communication channel may be understood to be a communication path, for example including one or more communication links (e.g. one or more communication connections) over one or more communication networks. For example, if the communication channel via which the secure communication path is established is a communication connection over the Internet, the key exchange may at least partially performed via a communication connection over a cellular communication network like a 2G/3G/4G/5G cellular communication network, for example by means of a Short Message Service provided by the cellular communication network if the mobile device support this service.

It is to be understood that the exchanged key may be temporary keys that are to be only used (1) once or (2) for a limited period of time or (3) for a limited number of uses. For example, if the exchanged keys are no longer valid (e.g. because the limited number of uses is reached), it may be necessary to perform a new key exchange for re-establishing the secure communication path. Alternatively, the exchanged keys may be permanent keys. In this case, the exchanged keys may always be used for re-establishing the secure communication path at a later time so that new key exchange may be then necessary.

The exchanged keys received by the mobile device may be stored in a secure storage of the mobile device such that they are (e.g. only) accessible by the positioning program. Therein, the secure storage may be the secure storage disclosed above in more detail.

As disclosed above, the mutual authentication and/or the key exchange may be performed according to the SSL or TSL protocol. In this case, establishing the secure communication path may be understood to involve the SSL or TSL protocol. However, if the mobile device is equipped with a UMTS Subscriber Identity Module (USIM), the mutual authentication and/or the key exchange may alternatively be performed according to the Extensible Authentication Protocol Method for 3rd Generation Authentication and Key Agreement (EAP-AKA) as specified by RFC4187 of the IETF (https://tools.ietf.org/). Therein, UMTS stands for Universal Mobile Telecommunications System and is specified by the 3G cellular radio communication standards developed by the 3GPP.

According to an exemplary embodiment of the invention, the one or more application programs are at least two application programs, wherein, for each of the at least two application programs, an individual signature parameter data set is received such that the one or more signature parameter data sets are at least two individual signature parameter data sets.

The at least two individual signature data sets are to be understood to be at least partially different. For example, each of the at least two individual signature data sets may contain or represent at least partially different input parameters for the digital signature algorithm which is used for determining and/or verifying the digital signature. Preferably, the private keys (e.g. for determining a digital signature) and the public keys (e.g. for verifying a digital signature) represented by or contained in the at least two individual signature data sets may be different for each of the at least two individual signature data sets, whereas further input parameters for the digital signature algorithm like domain parameters (e.g. DSA domain parameters (i.e. p, q and g)) represented by or contained in the at least two individual signature data sets may be equal for each of the at least two individual signature data sets. This may have the effect that, for each of the at least two application programs, an individual digital signature may be determined at least partially based on the respective individual signature parameter data set received for the respective application program of the at least two application programs and that the individual digital signature determined for a respective application program may only be verified at least partially based on the respective individual signature parameter data set received for the respective application program of the at least two application programs. By revoking such an individual digital signature data set, it is thus possible to stop providing the application program for which the revoked individual digital signature set has been received with individual signature data and, thus, to prevent this application program from verifying the position data without affecting any other application program of the at least two application programs.

To enable the positioning program to control determining the individual signatures for the at least two application programs, the individual signature data sets (e.g. the public portions and the private portions of the individual signature data sets) may be accessible by the positioning program (e.g. the positioning program has access rights for accessing the individual signature data sets); whereas each of the at least two application programs may only be allowed to access (e.g. has only access rights for accessing) the respective individual signature data set which has been received for the respective application program to enable the respective application program to control verifying the respective individual digital signature, preferably each of the at least two application programs may only access (e.g. has only access rights for accessing) the public portion of the respective individual signature data set which has been received for the respective application program. The individual signature data sets may be stored in the secure storage as disclosed above. A revoked individual digital signature data set may for example be removed from the secure storage.

As disclosed above, for each of the at least two application programs, an individual digital signature may be determined at least partially based on the respective individual signature parameter data set received for the respective application program of the at least two application programs. Moreover, for each of the at least two application programs, individual signature data representing the respective individual signature data determined for the respective application program of the at least two application programs may be obtained as a result of the determining. Accordingly, to each of the at least two application programs, individual signature data representing the individual digital signature determined for the respective one of the at least two application programs are provided. For example, the signature data provided to the one or more application programs may be understood to be individual signature data representing the individual digital signature determined for one of the at least two application programs. Accordingly, the respective individual signature data are provided individually or separately to the at least two application programs.

According to an exemplary embodiment of the invention, the method further comprises at least one of:
  re-establishing or initiating re-establishing the secure communication path to the remote device for receiving one or more updated signature parameter data sets;
  receiving the one or more updated signature parameter data sets via the secure communication path from the remote device.

Re-establishing or initiating re-establishing the secure communication path to the remote device may be understood to be performed by at least partially repeating the above disclosed step of establishing or initiating establishing the secure communication path. However, certain actions performed during establishing the secure communication path as disclosed above may only be repeated when re-establishing the secure communication path if necessary. For example, if keys exchanged during establishing the secure communication path as disclosed above are still valid, the key exchange may not be repeated when re-establishing the secure communication path.

Similarly, receiving the one or more updated signature parameter data sets via the secure communication path from the remote device may be understood to be performed by at least partially repeating the above disclosed step of receiving the one or more signature parameter data sets. Therein, the one or more updated signature parameter data sets may be at least partially different from the signature parameter data sets received during the above disclosed step of receiving the one or more signature parameter data sets.

This may have the effect that it is possible to communicate updated signature parameter data sets (e.g. by adding one or more new signature parameter data set(s) or revoking one or more signature parameter data sets) to the mobile device. For example, if one or more updated signature parameter data sets are received, the one or more signature parameter data sets stored in the secure storage as disclosed above may be replaced with the one or more updated signature parameter data sets.

According to an exemplary embodiment of the invention, the method as disclosed above is performed by the mobile device under control of the positioning program. In particular, the above disclosed steps relating to (1) establishing or initiating establishing the secure communication path, (2) receiving the one or more signature parameter data sets, (3) estimating a position of the mobile device, (4) determining a digital signature of the position data and (5) providing the position data and the signature data may be performed under control of the positioning program.

According to an exemplary embodiment of the invention, the method further comprises
  receiving, by at least one application program of the one or more application programs, the position data and the signature data;
  verifying, under control of the at least one application program, an authenticity and/or integrity of the position data at least partially based on the signature data.

As disclosed above, providing the position data and the signature data to the one or more application programs may be understood to mean that the position data and the signature data are provided such that they are receivable by (e.g. retrievable by) the application programs, for example by means of a programming interface or a service (e.g. being part of or defined by an operating system of the mobile device). Accordingly, receiving the position data and the signature data by the one or more application programs may be understood to mean that the position data and the signature data are received (e.g. obtained) or retrieved by the application programs, for example by means of a programming interface or a service (e.g. being part of or defined by an operating system of the mobile device). Therein, the signature data may be understood to represent at least one digital signature of the position data. Accordingly, in case more than one different digital signatures of the position data are determined, the position data may be individual signature data representing an individual digital signature of the more than one different digital signatures.

As further disclosed above, verifying the authenticity and/or integrity of the position data may be performed by use of (e.g. according to) a digital signature algorithm and/or a cryptography hash algorithm (e.g. the algorithm(s) used for determining the digital signature or (an) algorithm(s) corresponding to the algorithm(s) used for determining the digital signature). For example, the digital signature algorithm and/or the cryptography hash algorithm may be used to confirm that the digital signature is valid for the position data (i.e. is a digital signature of the position data). To this end, the digital signature algorithm and/or the cryptography hash algorithm may receive the position data and the digital signature (or signature data representing the digital signature) as input parameter.

Furthermore, each of the one or more signature parameter data sets may contain or represent input parameters for such a digital signature algorithm for verifying the digital signature. An example for such an input parameter given above is a public key, for example represented by or contained in the one or more signature parameter data sets. Accordingly, the authenticity and/or integrity of the position data may be verified based on a public key under control of the at least one application program. To this end, the public key needs to be accessible by the at least one application program. As disclosed above, the public key may be stored in the secure storage as disclosed above, for example the public key is represented by or contained in one of the one or more signature parameter data sets (e.g. a public portion of the one of the one or more signature parameter data sets) stored in the secure storage. Accordingly, the application program may be considered to have access to the public key if it has access rights for accessing (e.g. reading and/or writing) the one of the one or more signature parameter data sets representing or containing the public key (e.g. the public portion of the one of the one or more signature parameter data sets) or for accessing the secure storage storing this one of the one or more signature parameter data sets. It is to be understood that, for each of the one or more application programs, an individual public key needs to be accessible if for each of the one or more application programs an individual digital signature is determined as disclosed above.

If the authenticity and/or integrity of the position data is not verified or verifiable, the position data may be considered to be potentially manipulated (i.e. recognized as potentially manipulated). This may for example be the case if the position data provided by the positioning program are intercepted and manipulated by a malware.

Moreover, the method may further comprise at least one of the following, if the authenticity and/or integrity of the position data is verified:
  identifying, under control of the at least one application program, the position data as trustworthy;
  processing, under control of the at least one application program, the position data.

Alternatively or additionally, the method may further comprise at least one of the following, if the authenticity and/or integrity of the position data is not verified:
  identifying, under control of the at least one application program, the position data as potentially manipulated;
  rejecting, under control of the at least one application program, the position data.

Identifying the position data as trustworthy may be understood to mean that trust data identifying the position data as trustworthy are stored by the mobile device; and identifying the position data as potentially manipulated may be understood to mean that trust data identifying the position data as potentially manipulated are stored by the mobile device. For example, the trust data may be stored together with or may be added to the position data.

By identifying the position data as trustworthy or as potentially manipulated, this can be considered when further processing the position data. For example, for certain business services which rely on trustworthy positioning like car sharing services only position data identified as trustworthy may be used. For other business services position data may be used even if they are not identified as trustworthy (e.g. as potentially manipulated).

Processing the position data may be understood to mean that the position data are further processed under control of the at least one application program. For example the position data may be further processed as input parameter of an algorithm performed under control of the at least one application program. Rejecting the position data may be understood to mean that the rejected position data are not further processed under control of the at least one application program.

As disclosed above, the disclosed method is performed by a mobile device at least partially under control of a positioning program. This may however be understood to mean that at some steps of the disclosed method may be performed under control of the at least one application program. In particular, the above disclosed steps relating to (1) verifying an authenticity of the position data, (2) identifying, the position data as trustworthy or as potentially manipulated and (3) processing or rejecting the position data may be performed under control of the at least one application program.

A certain step of the disclosed method may be understood to be performed under control of the at least one application program, when the at least one application program runs on the mobile device and causes the mobile device to perform the certain step of the disclosed method. For example, all steps caused by the at least one application program program running on the mobile device are to be understood to be performed under control of the at least one application program. To this end, the at least one application program may be represented by computer program code which causes the mobile device, when executed by a processor (or by a plurality of processors) to perform one or more steps of the disclosed method. Accordingly, the at least one application program may be considered to run on the mobile device, when such a computer program code representing the at least one application program is executed by a processor (or by a plurality of processors) of the mobile device, and causes the mobile device to perform one or more steps of the disclosed method.

According to an exemplary embodiment of the invention, the one or more radio signal parameters are radio signal parameters of one or more radio signals observed by the mobile device at an observation position.

For example, each of the one or more radio signals is one of:
  a GNSS satellite radio signal,
  a cellular radio signal,
  a Bluetooth radio signal;
  an LPWAN radio signal;
  a WLAN radio signal.

Accordingly, the one or more radio signals may be transmitted by one or more of the following radio devices:
  a GNSS satellite;
  a Bluetooth beacon (e.g. a Bluetooth beacon enabling Bluetooth low energy mode or a Bluetooth low energy beacon);
  an access point of a wireless local area network;
  an access point of a low-power wide area network; and
  a cellular network node.

A GNSS satellite may for example be one of a GPS or Galileo satellite having a radio interface which includes at least a radio transmitter for transmitting a GPS or Galileo satellite signal. GNSS based positioning technologies are supported by many mobile devices by default such as most smartphones, most tablet computers, most notebook computers, most smart watches and most smart bands, etc. Using GNSS satellite radio signals may thus have the effect that many mobile devices may make use of the invention without any adaptation of hardware.

The Bluetooth beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals. A Bluetooth beacon that is employed for the invention may be any kind of Bluetooth beacon complying with any present or future standard. The Bluetooth standards are specified by the Bluetooth Special Interest Group and are presently available under https://www.bluetooth.com/.

Such Bluetooth beacons may be easily installed as dedicated position support radio devices at various installation positions and require little to no maintenance. For example, a plurality of Bluetooth beacons may be easily distributed across a certain area and may cover a certain area (e.g. the area of the environment represented by the radio map and/or of the above disclosed system) with Bluetooth radio signals transmitted (e.g. broadcasted) by the Bluetooth beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that many mobile devices may make use of the invention without any adaptation of hardware. Moreover, such a non-GNSS based positioning system enables indoor positioning, for examples if no GNSS satellite signals are receivable. As a result, the approach may be globally scalable and have low maintenance and deployment costs. In addition, regarding positioning utilizing received signal strength the end-user experience may be acceptable with these technologies, since a horizontal positioning accuracy of 2 to 3 meters as well as a high reliability in floor detection may be achieved. The Bluetooth beacons may be stand-alone devices or be integrated into or attached to some other device. Bluetooth beacons, in particular in low energy mode, require comparably little energy and the use of Bluetooth low energy may enable a positioning with limited energy consumption at all involved devices.

It is to be understood, however, that other types of radio devices than variations of Bluetooth beacons may be used as well as dedicated position support radio devices, for instance tags or other devices that are configured to transmit ultra-wideband (UWB) signals or any wireless radio signals that might emerge in the future.

Moreover, existing radio devices like WLAN access points, LPWAN access points or cellular network nodes may be used alternatively or additionally.

A WLAN access point may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (http://www.ieee.org/).

An LPWAN access point may comprise an LPWAN radio interface, which for example includes an LPWAN transceiver. The LPWAN radio interface may be configured to transmit and/or receive LPWAN radio signals. Accordingly, the radio signal transmitted by such an access point of an LPWAN may be an LPWAN radio signal. Examples of LPWAN specifications are the LoRaWAN specification developed by the LoRa Alliance and presently available under https://lora-alliance.org/ as well as the Narrowband IoT (NB-IoT) specification developed by 3GPP and presently available under http://www.3gpp.org/.

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal.

According to an exemplary embodiment of the invention, the estimating a position of the mobile device is further at least partially based on a radio map of a non-GNSS based radio positioning system.

As disclosed above, a radio map of a non-GNSS based radio positioning system may represent, for each radio device of a plurality of radio devices, a respective radio model like a hard-boundary model or a soft-boundary model.

An example for a soft-boundary radio model may be a parametric radio model. For example, such a parametric radio model may represent or comprise one or more radio transmission parameters (e.g. path-loss exponent and transmission power) characteristic for the expected propagation of one or more radio signals transmitted by a radio device. Using radio transmission parameters of the parametric radio model may have the effect that the required amount of data for defining the one or more characteristics of one or more radio signals may be particularly small. An example of a parametric radio model is a path loss model for radio signals transmitted or triggered to be transmitted by a radio device. In this case, the radio transmission parameters may comprise a path loss exponent and an indication of a transmission power used by the transmitter of the radio device. Based on the parametric radio model an expected radio coverage of a radio device may be determined.

Alternatively or additionally, a soft boundary radio model may be a radio image model representing an expected radio signal strength field of a radio signal transmitted or triggered to be transmitted by a radio device. An example of such a radio image model is a signal strength matrix model like a signal strength heatmap or a signal strength matrix.

An example for a hard-boundary radio model may be a geometric model. The radio model may be referred to as a geometric model of an expected radio coverage of a radio device if it is a geometric shape, such as for example a polygon, a rectangle and/or a square, a cuboid and/or a cube, an ellipse and/or a circle or an ellipsoid and/or a sphere. Using such geometric models representing the expected radio coverage of respective radio devices within the predetermined environment of the radio map has the effect that the radio model is very simple, only requires a small amount of data and is easy to analyze.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
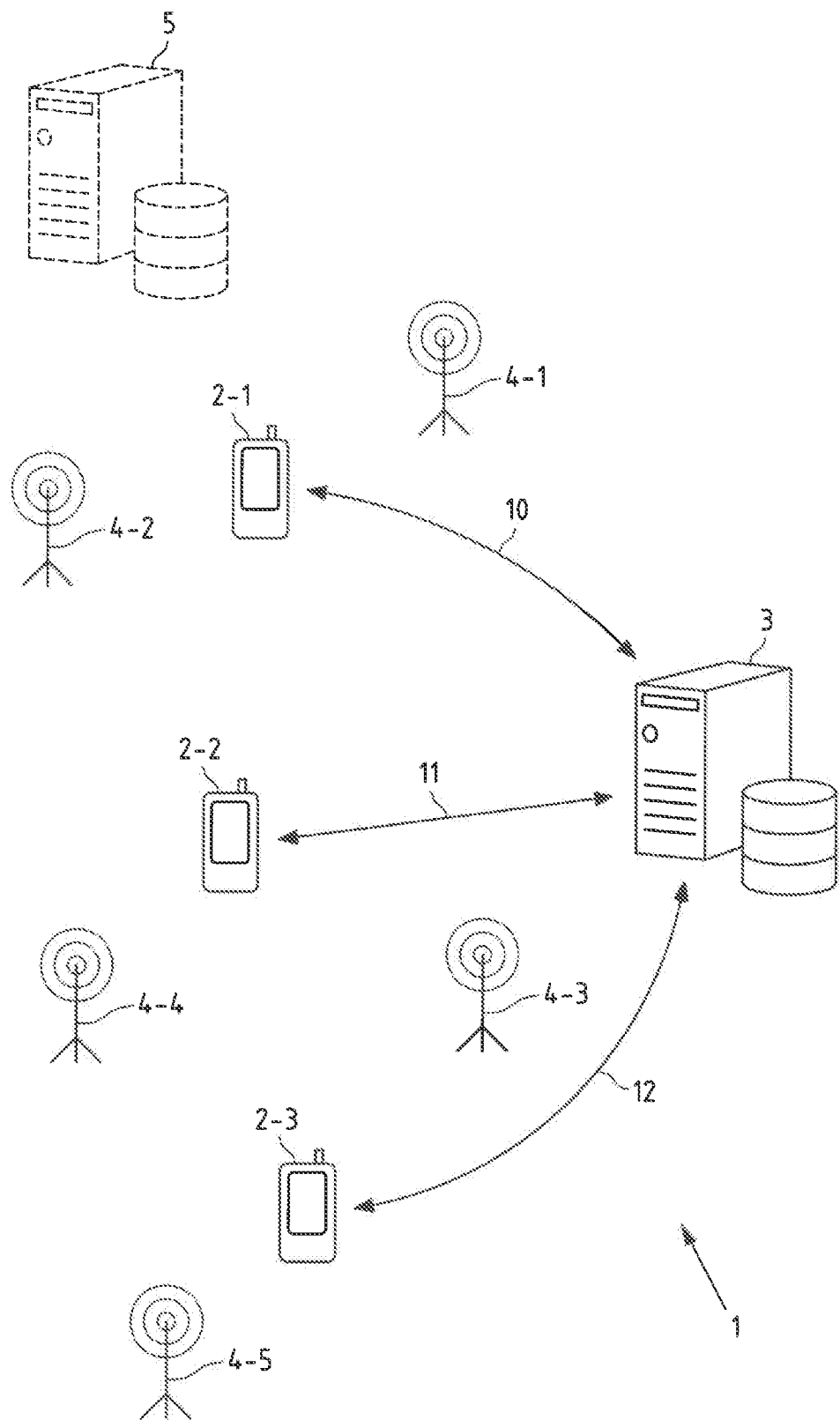
FIG. 1 is a block diagram of an exemplary embodiment of a system according to the invention.

FIG. 1 is a schematic high-level block diagram of a radio positioning system 1 according to an exemplary aspect of the invention. For exemplary purposes and without limiting the scope of the invention, it is assumed in the following that system 1 is a non-GNSS based radio positioning system for a predetermined environment like a building or a complex of buildings (e.g. a shopping center, a parking garage, an airport, a company site, etc).

For example, each of mobile devices 2-1 to 2-3 may be one of a smartphone, a tablet computer, a notebook computer, a smart watch and a smart band. Mobile devices 2-1 to 2-3 may be enabled for or support non-GNSS based radio positioning system 1.

System 1 comprises a key server 3, a plurality of optional radio devices 4-1 to 4-5 and an optional positioning server 5.

System 1 is not limited to a single key server 3, but may optionally comprise a plurality of servers (e.g. forming a server cloud). Accordingly, key server 3 may be part of such a plurality of servers (e.g. a server cloud) or may be represented by such a plurality of servers (e.g. a server cloud). Likewise, positioning server 5 may be part of such a plurality of servers (e.g. a server cloud) or may be represented by such a plurality of servers (e.g. a server cloud).

Key server 3 may be a key server of the distributor of a positioning program installed on mobile devices 2-1 to 2-3.

Each of mobile devices 2-1 to 2-3 may communicate with key server 3 after establishing a secure communication path like one of secure communication paths 10 to 12 to key server 3. For example, the communication paths 10 to 12 may include one or more communication links (e.g. one or more communication connections) over one or more communication networks. For example, each of the communication paths 10 to 12 includes a communication link over a cellular communication network like a 2G/3G/4G/5G cellular communication network and a communication link over the Internet. Moreover, each of the secure communication paths 10 to 12 may be a TLS connection. It is however to be understood that the present invention is not limited to such secure communication paths.

For exemplary purposes and without limiting the scope of the invention, it is furthermore assumed in the following that radio devices 4-1 to 4-5 are dedicated position support radio devices in the form of BLE beacons 4-1 to 4-5 fixedly installed in the predetermined environment of system 1. However, system 1 may comprise further radio devices or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio devices 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio devices 4-1 to 4-5 transmitting the respective radio signal containing this positioning support information.

In the training stage of system 1, mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to positioning server 5 for determining a radio map.

For example, the radio map may be configured to enable mobile devices 2-1 to 2-3 to estimate their position at least partially based on this radio map when the mobile devices are located within the predetermined environment of system 1 (i.e. the area covered by the radio map). For example, the radio map is represented by radio map information which may be provided (e.g. transmitted) by a positioning server 5 to mobile devices 2-1 to 2-3 and/or which may be held available by mobile device 2-1 to 2-3 (e.g. stored in a memory of mobile devices 2-1 to 2-3). For example, the radio map contains or represents a respective radio model for each of BLE beacons 4-1 to 4-5. Moreover, the radio map may represent the respective installation position of each of BLE beacons 4-1 to 4-5. As disclosed above, a respective radio model for a respective BLE beacon of BLE beacons 4-1 to 4-5 may be understood to represent at least the expected radio coverage of the respective radio device. For example, the radio model of such a BLE beacon may at least describe the coverage area within which radio signals transmitted by this radio device are expected to be observable.

In the positioning stage, mobile devices 2-1 to 2-3 may use the radio map to determine their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example determine (e.g. estimate) by use of the radio map that its presents position is within the overlapping region of the coverage areas described by the radio models of BLE beacons 4-1, 4-2 and 4-3.

Figure 2:
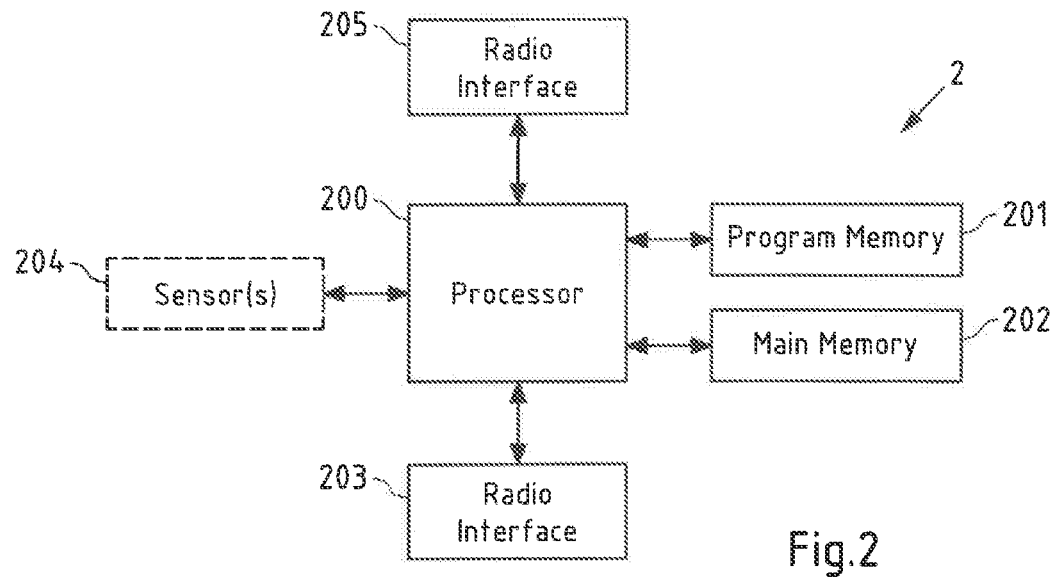
FIG. 2 is a block diagram of an exemplary embodiment of a mobile device according to the invention.

FIG. 2 is a block diagram of an exemplary embodiment of mobile device 2 according to the invention. In the following, it is assumed that mobile devices 2-1 to 2-3 of FIG. 1 corresponds to this mobile device 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code representing a positioning program and/or an application program causing mobile device 2 to perform any one embodiment of the disclosed method (e.g. the steps of any one embodiment of the disclosed method) or a part thereof (e.g. at least some steps of any one embodiment of the disclosed method) (as for instance further described below with reference to FIG. 5), when executed on processor 200), and interfaces with a main memory 202.

Program memory 201 may also contain a secure storage (e.g. a data container like a file or a database) for storing one or more signature parameter data sets, an operating system for processor 200 and radio map information representing a radio map of the predetermined environment of system 1. As disclosed above, an example of an operating system of mobile device 2 is the Android operating system; and an example of a secure storage may be the keystore-service of the Android operating system.

Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a radio interface 203 configured for receiving and, optionally, transmitting radio signals. A radio interface may be or may comprise a radio receiver circuit and/or a radio transmitter circuit and/or a radio transceiver circuit. Such circuits may comprise modulators, filters, mixers, switches and/or one or more antennas to allow transmission and/or reception of radio signals.

In the following, it is assumed for exemplary purposes that radio interface 203 is a BLE transceiver configured to transmit and receive BLE radio signals in line with any current or future version of the Bluetooth standard supporting a low energy mode. Radio interface 203 enables mobile device 2 to scan for observable BLE radio signals transmitted (e.g. broadcasted) by BLE beacons 4-1 to 4-5 of system 1. Therein, a BLE radio signal may be understood to be observable if the BLE radio signal is receivable with a minimum quality (e.g. a minimum signal-to-noise ratio and/or a minimum signal power, e.g. at least −90 dBm or −95 dBm). Moreover, the BLE transceiver is configured, alone or together with processor 200, to determine one or more radio signal parameters of BLE radio signals observed (e.g. received) when scanning for observable radio signals. To this end, the BLE transceiver may for example extract, from each observed BLE radio signal, the respective UUID contained therein and measure the respective received signal strength of each observed BLE radio signal. The extracted UUIDs and the received signal strength values may then for example be provided to processor 200 as scanning results (e.g. for further processing by processor 200 under control of the positioning program). It is to be understood that any computer program code required for receiving and processing received BLE radio signals may be stored in an own memory of the radio interface 203 and executed by an own processor of the radio interface 203 or it may be stored for example in memory 202 and executed for example by processor 200.

Moreover, processor 200 controls one or more optional sensors 204 configured for determining sensor information indicating a position or movement of mobile device 2. The determined sensor information may be provided to processor 200. Examples of sensors 204 are a GNSS sensor (e.g. a GPS sensor and/or a Galileo sensor), an inertial or motion sensor (e.g. a speed sensor, an acceleration sensor, a shock sensor, an activity or step sensor, an orientation sensor like a compass or a gyroscope), an optical sensor (e.g. a camera), or a combination thereof.

Processor 200 further controls a radio interface 205 configured to communicate via a cellular radio network (e.g. to transmit and receive cellular radio signals). For example, radio interface 205 may be or may comprise a 2G/3G/4G/5G radio transceiver. Mobile device 2 may use radio interface 205 to communicate with key server 3 (e.g. via one of secure communication paths 10, 11 and 12) and/or positioning server 5 of system 1. For example, mobile device 2 may use radio interface 205 to transmit radio fingerprint observation reports to positioning server 3 and/or receive radio map information from positioning server 5. Moreover, mobile device 2 may use radio interface 205 to establish a secure communication path (e.g. one of secure communication paths 10, 11 and 12) and/or to receive one or more signature parameter data sets from key server 3.

The components 201 to 205 of mobile device 2 may for instance be connected with processor 200 by means of one or more serial and/or parallel busses.

It is to be understood that mobile device 2 may comprise various other components like a user interface for receiving user input.

Figure 3:
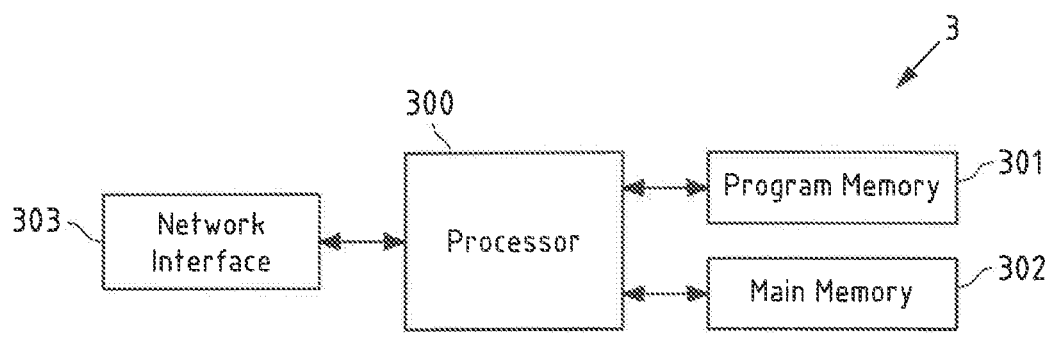
FIG. 3 is a block diagram of an exemplary embodiment of a positioning server according to the invention.

FIG. 3 is a block diagram of an exemplary embodiment of key server 3 according to the invention. In the following, it is assumed that key server 3 of system 1 of FIG. 1 corresponds to this key server 3.

Key server 3 comprises a processor 300. Processor 300 may represent a single processor or two or more processors, which are for instance at least partially coupled, for instance via a bus. Processor 300 executes a computer program code stored (e.g. computer program code causing positioning server 3 to establish a secure communication path like secure communication paths 10, 11 and 12 and to transmit one or more signature parameter data sets to mobile devices 2-1 to 2-3) in program memory 301, and interfaces with a main memory 302. Program memory 301 may also contain an operating system for processor 300 and radio map information representing a radio map of the predetermined environment system 1. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a network interface 303 which is configured to communicate via a communication network (e.g. the internet). Key server 3 may use network interface 303 to communicate with mobile devices 2-1 to 2-3 of FIG. 1 (e.g. via secure communication paths 10 to 12). For example, key server 3 may use network interface 303 to establish secure communication paths 10 to 12 and to transmit one or more signature parameter data sets to mobile devices 2-1 to 2-3.

The components 301 to 303 of key server 3 may for example be connected with processor 300 by means of one or more serial and/or parallel busses. It is to be understood that key server 3 may comprise various other components like a user interface for receiving user input.

Positioning server 5 may at least have similar hardware components like key server 3. Accordingly, the above disclosure relating to hardware components (e.g. processor, program memory, main memory, network interface) of key server 3 may be understood to be a disclosure relating to hardware components of an exemplary embodiment of positioning server 5 as well.

Figure 4:
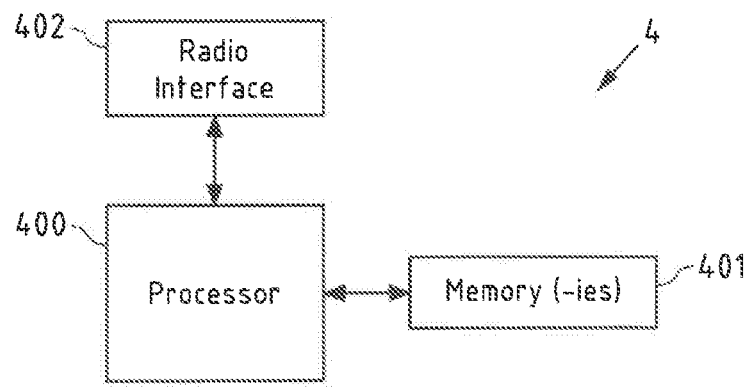
FIG. 4 is a block diagram of an exemplary embodiment of a radio device according to the invention.

FIG. 4 is a block diagram of an exemplary embodiment of a radio device 4 according to the invention. In the following, it is assumed that this radio device 4 is a BLE beacon and corresponds to BLE beacons 4-1 to 4-5 of system 1.

BLE beacon 4 comprises a processor 400. Processor 400 may represent a single processor or two or more processors, which are for instance at least partially coupled, for instance via a bus. Processor 400 executes a program code stored in memory(-ies) 401. Memory(-ies) 401 may also comprise an operating system for processor 400. Memory(-ies) 401 may for instance comprise a first memory portion that is fixedly installed in BLE beacon 4, and a second memory portion that is removable from beacon 4, for instance in the form of a removable SD memory card. Some or all of memory(ies) 401 may also be included into processor 400. Memory(ies) 401 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 400 when executing an operating system and/or computer program code.

Processor 400 further controls a radio interface 402 configured to receive and/or transmit BLE radio signals. For instance, radio interface 402 may at least comprise a BLE transmitter. The radio interface 402 may additionally comprise a BLE receiver. The transmitter and receiver may also be part of a BLE transceiver. The BLE transmitter enables BLE beacon 4 to transmit BLE radio signals in line with any current or future version of the Bluetooth standard supporting a low energy mode. For example, the BLE transmitter may be configured to automatically and repeatedly transmit BLE radio signals like an advertisement signal. As disclosed above in more detail, such a BLE radio signal may contain and/or represent positioning support information (e.g. a UUID of BLE beacon 4). Likewise, the BLE receiver enables BLE beacon 4 to receive BLE radio signals in line with any current or future version of the Bluetooth standard supporting a low energy mode.

The components 401 to 402 of BLE beacon 4 may for example be connected with processor 400 by means of one or more serial and/or parallel busses.

It is to be understood that BLE beacon 4 may comprise various other components.

Figure 5:
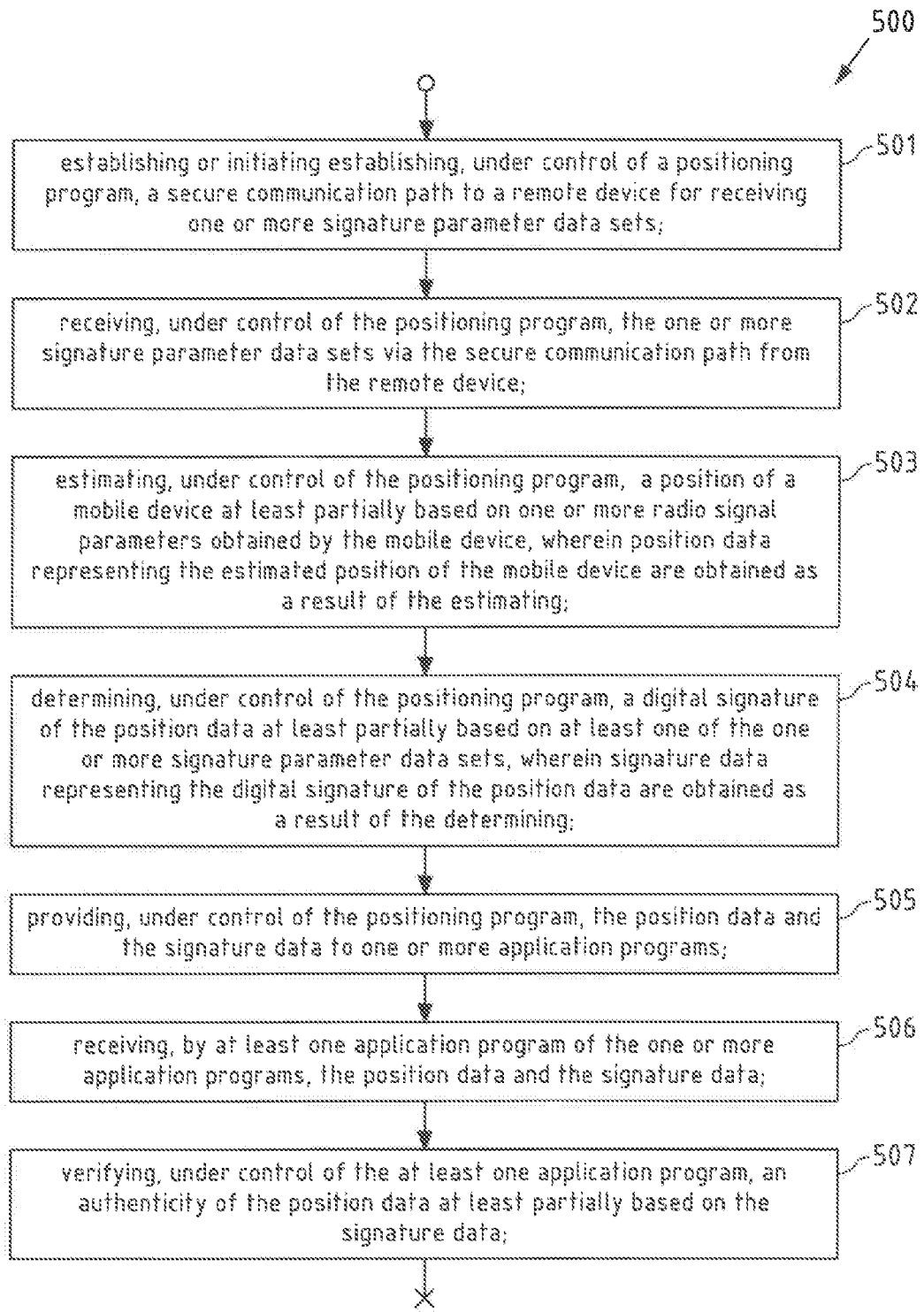
FIG. 5 is a flow chart illustrating an exemplary embodiment of a method according to the invention.

FIG. 5 is a flow chart 500 illustrating an exemplary embodiment of a method according to the invention. Without limiting the scope of the invention, it is assumed in the following that mobile device 2-1 as described above with respect to FIG. 1 performs the steps of flow chart 500. In particular, it is assumed in the following that mobile device 2-1 performs steps 501 to 505 under control of a positioning program and optional steps 506 to 507 under control of at least one application program.

Therein, the steps of flowchart 500 may be understood to be performed under control of the positioning program and the application program, respectively, when the positioning program and the application program run on the mobile device and cause the mobile device to perform steps 501 to 505 and 506 to 507, respectively. To this end, computer program code representing the positioning program and the at least one application program may be stored in program memory 201. When the computer program code representing the positioning program and the at least one application program are loaded into main memory 202 and executed by processor 200, they may cause mobile device 2-1 to perform the steps of flow chart 500.

Figure 6A:
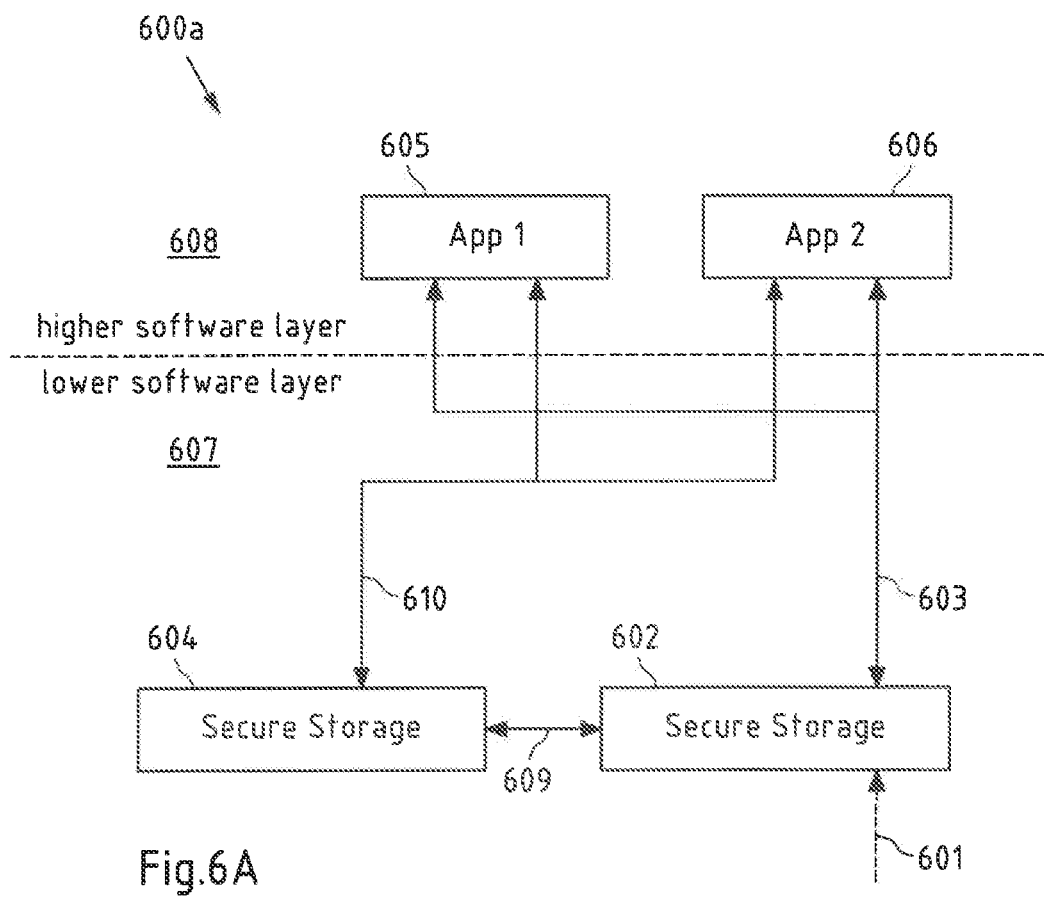
FIG. 6A illustrates an exemplary software architecture of a mobile device according to the invention.

FIG. 6A illustrates an exemplary software architecture 600a of mobile device 2-1 relating to the execution of the positioning program having reference sign 602 and two application programs App1 and App2 having reference signs 605 and 606, respectively. As apparent from FIG. 6A, positioning program 602 is part of a lower software layer 607 like an operating system layer or a service layer and application programs 605 and 606 are part of a higher software layer like the application layer. When positioning program 602 is executed by processor 200, it may for example provide certain positioning-related services to other programs like application programs 605 and 606. Positioning program 602 may for example communicate with other programs like application programs 605 and 606 by means of one or more programming interfaces to provide position data and signature data to application programs 605 and 606 as indicated by arrow 603 in FIG. 6A.

Furthermore, a secure storage 604 is illustrated as part of the lower software layer in FIG. 6A. The secure storage 604 may be understood to be a data container (e.g. a file or a database) which is managed and/or protected by the operating system of the mobile device. An example of a secure storage functionality of an operating system is the keystore-service of the Android operating system.

For example, the secure storage may be only accessible by programs and/or users that have been granted access rights for accessing (e.g. reading and/or writing) the secure storage or certain data stored in the secure storage.

In the following, it is assumed that mobile device 2-1 performs steps 501 to 505 of flowchart 500 under control of positioning program 602 and optional steps 506 to 507 of flowchart 500 under control of application programs 605 and 606.

In step 501, secure communication path 10 is established to key server 3 for receiving one or more signature parameter data sets or establishing of secure communication path 10 is initiated.

As disclosed above, secure communication path 10 may be a TLS connection. Accordingly, establishing communication path 10 may be performed according to the TLS protocol by performing a TLS handshake between mobile device 2-1 and key server 3. Mobile device 2-1 may initiate the TLS handshake (i.e. establishing of secure communication path 10) by transmitting a "client hello message" according to the TLS protocol to key server 3. During the TLS handshake, mutual authentication of mobile device 2-1 and key server 3 according to the TLS protocol may be performed such that mobile device 2-1 authenticates key server 3 (e.g. based on a server certificate of key server 3) and key server 3 authenticates mobile device 2-1 (e.g. based on a client certificate of mobile device 2-1 or of positioning program 602). Moreover, a key exchange may be performed during the TLS handshake to enable mobile device 2-1 and key server 3 to encrypt outgoing communication via secure communication path 10 and to decrypt incoming communication via secure communication path 10.

For example, the computer program code representing the positioning program 602 contains and/or represents instructions for establishing secure communication path 10 by performing a TLS handshake of mobile device 2-1 with key server 3 and for initiating establishing of a secure communication path 10 by transmitting a "client hello message" according to the TLS protocol from mobile device 2-1 to key server 3 and to perform a TLS.

In step 502, the one or more signature parameter data sets are received via secure communication path 10 from key server 3. This may be understood to mean that the one or more signature parameter data sets are only received if secure communication path 10 to key server 3 is established in step 501.

As disclosed above, for each of application programs 605 and 606, an individual signature parameter set may be received in step 502. Accordingly, it is assumed in the following that at least two individual signature parameter data sets for application programs 605 and 606 are received in step 502.

Each of the at least two individual signature parameter data sets may contain or represent input parameters for a digital signature algorithm which is used for determining the digital signature in step 504 as disclosed below and for verifying the digital signature in step 507 as disclosed below. Moreover, each of the at least two individual signature parameter data sets may comprise a private portion and a public portion. The public portion may for example contain and/or represent input parameters for the digital signature algorithm that are necessary for both determining and verifying the digital signature as well as input parameters (e.g. the public key) that are necessary for verifying the digital signature. The private portion may for example contain and/or represent input parameters (e.g. the private key) that are only necessary for determining the digital signature.

The at least two individual signature parameter data sets received in step 502 may be subsequently stored in secure storage 604 of mobile device 2-1. As disclosed above, secure storage 604 may be understood to be a data container (e.g. a file or a database) which is managed and/or protected by the operating system of the mobile device. An example of a secure storage functionality of an operating system is the keystore-service of the Android operating system.

Figure 6B:
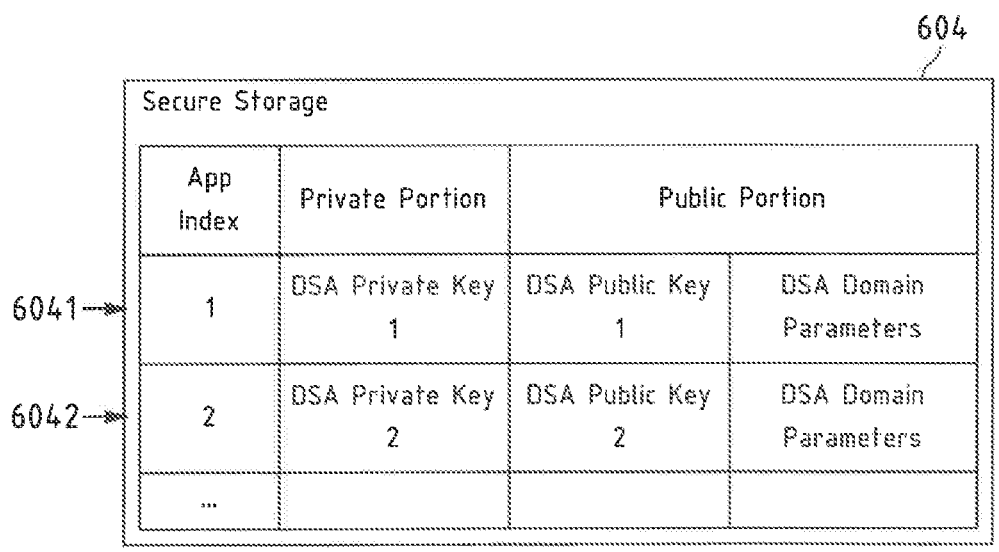
FIG. 6B illustrates an exemplary representation of a secure storage of a mobile device according to the invention.

An exemplary representation of the secure storage 604 is illustrated in FIG. 6B. The at least two individual signature parameter data sets received in step 502 for application programs 605 and 606, respectively, have reference signs 6041 and 6042, respectively. As apparent from FIG. 6B, each of the at least two individual signature parameter data sets 6041 and 6042 have a private portion containing or representing a DSA private key and a public portion containing or representing a DSA public key and DSA domain parameters. Therein, the DSA key pairs are different for each of the at least two individual signature parameter data sets 6041 and 6042, whereas the DSA domain parameters are equal for each of the at least two individual signature parameter data sets 6041 and 6042.

For example, individual signature parameter data set 6041 is received for application program 605 (i.e. "App 1") in step 502 and that that individual signature parameter data set 6042 is received for application program 606 (i.e. "App 2")

in step 502. Accordingly, application program 605 may have access rights for accessing the public portion of individual signature parameter data set 6041 stored in secure storage 604; and application program 606 may have access rights for accessing the public portion of individual signature parameter data set 6042 stored in secure storage 604. Positioning program 602 may have access rights for accessing the private and public portions of individual signature parameter data sets 6041 and 6042.

For example, the computer program code representing the positioning program 602 contains and/or represents instructions for storing the at least two individual signature parameter data sets 6041 and 6042 received in step 502 in secure storage 604.

In step 503, a position of mobile device 2-1 is estimated at least partially based on one or more radio signal parameters obtained by mobile device 2-1.

As disclosed above, the radio map may be used for estimating of a position of mobile device 2-1 at least partially based on obtained radio signal parameter(s). For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example be estimated by use of the radio map that the present position of mobile device is within the overlapping region of the coverage areas described by the radio models of BLE beacons 4-1, 4-2 an 4-3 represented by or contained in the radio map. Alternatively or additionally, a position of mobile device 2-1 may be estimated by (1) triangulation at least partially based on AOA values of the three BLE radio signals and/or (2) trilateration or multilateration at least partially based on RSSIs or TOF values of the three BLE radio signals.

For example, the computer program code representing the positioning program 602 may contain and/or represent instructions for accordingly estimating the position of mobile device 2-1 at least partially based on radio signal parameters of one or more radio signals obtained by mobile device 2-1 at this position. As disclosed above, radio interface 203, is configured, alone or together with processor 200, to determine one or more radio signal parameters of BLE radio signals observed (e.g. received) when scanning for observable radio signals. For example, the radio signal parameters obtained by radio interface 203 may be received by positioning program 602 from another program like a driver program for radio interface 203 executed by processor 200 as indicated by arrow 601 in FIG. 6A.

As a result of the estimating in step 503, position data representing the estimated position of mobile device 2-1 are obtained.

In step 504, a digital signature of the position data is determined at least partially based on at least one of the one or more signature parameter data sets.

The digital signature may be determined by use of (e.g. according to) a digital signature algorithm. In the following, it is assumed that the digital signature algorithm used for determining the digital signatures is DSA. An input parameter of DSA is a hash value of the position data. A hash value of the position data may be obtained by use of (e.g. according to) a cryptography hash algorithm receiving the position data as input parameter. Examples of cryptography hash algorithms are (1) SHA-1 or the SHA-2 algorithm family, (2) SHA-3 or (3) MD5. Furthermore, the input parameters represented by or contained in the one or more signature parameter data sets received in step 502 may be at least partially used for determining the digital signature.

As disclosed above, for each of application programs 605 and 606, an individual signature parameter data set 6041 or 6042 is received in step 502. Accordingly, in step 504, for each of application programs 605 and 606, an individual digital signature of the position data is determined in step 504 at least partially based on the individual signature parameter data set of the individual signature parameter data sets 6041 or 6042 received for the respective one of application programs 605 and 606. To this end, positioning program 602 may access secure storage 604 as indicated by arrow 609 in FIG. 6A.

For example, the individual digital signature of the position data for application program 605 is determined according to DSA by use of the DSA private key 1 and the DSA domain parameters represented by or contained in individual signature parameter data set 6041 as input parameters. Likewise, the individual digital signature of the position data for application program 606 is determined according to DSA by use of the DSA private key 2 and the DSA domain parameters represented by or contained in individual signature parameter data set 6042 as input parameters.

Since at least partially different input parameters are used for the determining, the individual digital signatures of the position data for application programs 605 and 606 are different.

As a result of the determining in step 504, individual signature data representing the individual digital signature of the position data for application program 605 and individual signature data representing the individual digital signature of the position data for application program 606 are obtained.

In step 505, the position data obtained as a result of the estimating in step 503 and the signature data obtained as a result of the estimating in step 504 are provided to application programs 605 and 606.

For example, the position data obtained in step 503 and the individual signature data representing the individual digital signature of the position data for application program 605 obtained in step 504 are provided to application program 605 in step 505. Likewise, the position data obtained in step 503 and the individual signature data representing the individual digital signature of the position data for application program 606 obtained in step 504 are provided to application program 606 in step 505

As disclosed above, positioning program 602 may for example communicate with other programs like application programs 605 and 606 by means of one or more programming interfaces to provide position data and signature data to application programs 605 and 606 as indicated by arrow 603 in FIG. 6A. Accordingly, the position data and the signature data may be provided in step 505 such that they are receivable by application programs 605 and 606 by means of such a programming interface.

In optional step 506, the position data and the signature data are received by application programs 605 and 606. In particular, the position data and the signature data provided under control of positioning program 602 in step 503 may be received by application programs 605 and 606 in step 504.

Accordingly, application programs 605 may receive the position data and the individual signature data representing the individual digital signature of the position data for application program 605 in step 506; and application programs 606 may receive the position data and the individual signature data representing the individual digital signature of the position data for application program 606 in step 506.

In optional step 507, an authenticity and/or integrity of the position data is verified at least partially based on the signature data received in step 506.

Verifying the authenticity of the position data may be understood to mean that it is verified that the position data were estimated under control of the positioning program in step 503; and verifying the integrity of the position data may be understood to mean that it is verified that the position data have not been altered (e.g. manipulated) after the estimating in step 503 (e.g. by a location malware).

The digital signature may be verified by use of (e.g. according to) a digital signature algorithm. In the following, it is assumed that the digital signature algorithm used for verifying the digital signatures is DSA. An input parameter of DSA is a hash value of the position data. A hash value of the position data may be obtained by use of (e.g. according to) a cryptography hash algorithm (e.g. the same cryptography hash algorithm used for determining the digital signature in step 504) receiving the position data as input parameter. Furthermore, the input parameters represented by or contained in the one or more signature parameter data sets received in step 502 may be at least partially used for verifying the digital signature.

As disclosed above, for each of application programs 605 and 606, individual signature data representing an individual digital signature of the position data is received in step 506. Accordingly, application programs 605 and 606 verify the authenticity and/or integrity of the position data independently from each other. In particular, application program 605 verifies that the authenticity and/or integrity of the position data at least partially based on the individual signature data representing the individual digital signature of the position data for application program 605; and application program 606 verifies that the authenticity and/or integrity of the position data at least partially based on the individual signature data representing the individual digital signature of the position data for application program 606. To this end, application programs 605 and 606 may access secure storage 604 as indicated by arrow 610 in FIG. 6A.

For example, the position data are verified at least partially based on the individual digital data of the position data for application 605 by use of the DSA public key 1 and the DSA domain parameters represented by or contained in individual signature parameter data set 6041 as input parameters. Likewise, the position data are verified at least partially based on the individual digital data of the position data for application 606 by use of the DSA private key 2 and the DSA domain parameters represented by or contained in individual signature parameter data set 6042 as input parameters.

For example, application programs 605 and/or 606 may only further process or allow further processing of the position data received in step 506, if the authenticity and/or integrity of the position data is verified in step 505. Otherwise, application programs 605 and/or 606 may reject the position data.

Since the application programs 605 and 606 verify the authenticity and/or integrity of the position data independently from each other and at least partially based on different signature data, it is possible to stop providing one of the applications programs 605 and 606 with individual signature data (e.g. by revoking the individual signature parameters set which has been received for this application program in step 502) without affecting the other one of the applications programs 605 and 606. The present invention thus enables a flexible provision of signature data of position data representing an estimated position to one or more application programs.

Figure 7:
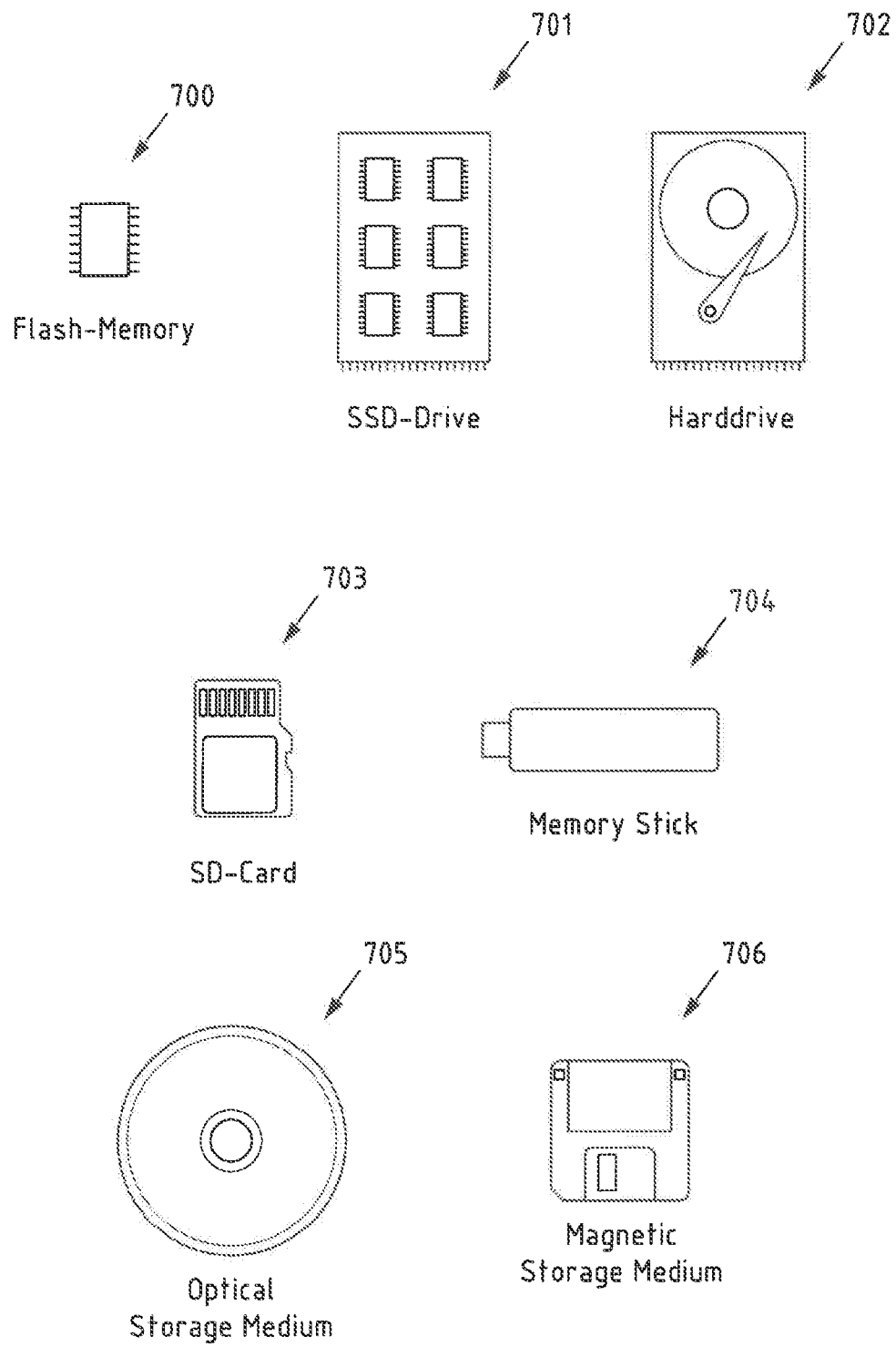
FIG. 7 is a schematic illustration of examples of tangible and non-transitory storage media according to the invention.

FIG. 7 is a schematic illustration of examples of tangible and non-transitory computer-readable storage media according to the present invention that may for instance be used to implement memory 201 of FIG. 2, memory 301 of FIG. 3 and memory(-ies) 401 of FIG. 4. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201, 301 and 401 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by a mobile device at least partially under control of a positioning program, the method comprising:
    establishing or initiating establishing a secure communication path to a remote device for receiving one or more signature parameter data sets;
    receiving said one or more signature parameter data sets, said signature parameter data sets each comprising respective one or more parameters for use as input of a respective digital signature algorithm, said signature parameter data sets received via said secure communication path from said remote device;
    estimating a position of said mobile device at least partially based on one or more radio signal parameters obtained by said mobile device, wherein position data representing said estimated position of said mobile device are obtained as a result of said estimating;
    determining a digital signature of said position data by providing at least said position data and the at least one of said one or more signature parameter data sets as input to the respective digital signature algorithm and causing the digital signature algorithm to generate signature data representing said digital signature of said position data based at least in part on said position data and the at least one of said one or more signature parameter data sets; and
    providing said position data and said signature data to one or more application programs.

2. The method according to claim 1, wherein each of said signature parameter data sets contains or represents at least one of:
    a private key or a public key;
    a cryptography hash algorithm or an identification of a cryptography hash algorithm;
    one or more further input parameters for a cryptography hash algorithm;
    a digital signature algorithm or an identification of a digital signature algorithm; or
    one or more further input parameters for a digital signature algorithm.

3. The method according to claim 1, wherein the method further comprises:
    storing said one or more signature parameter data sets at least partially in a secure storage of said mobile device accessible by said positioning program.

4. The method according to claim 1, wherein said establishing said secure communication path involves at least one of:
    mutual authentication of said mobile device and said remote device;
    key exchange between said mobile device and said remote device;
    Transport Layer Security protocol;
    Secure Sockets Layer protocol; or
    Extensible Authentication Protocol.

5. The method according to claim 1, wherein said one or more application programs are at least two application programs, and wherein, for each of said at least two application programs, a respective individual signature parameter data set associated with a respective application program of said at least two application programs is obtained such that said one or more signature parameter data sets are at least two individual signature parameter data sets.

6. The method according to claim 5, wherein, for each of said at least two application programs, a respective individual digital signature is determined at least partially based on said respective individual signature parameter data set obtained for said respective application program of said at least two application programs.

7. The method according to claim 6, wherein respective individual signature data are provided to each of said at least two application programs representing said respective individual digital signature determined for said respective application program of said at least two application programs.

8. The method according to claim 1, wherein the method is performed by said mobile device under control of said positioning program.

9. The method according to claim 1, the method further comprising:
receiving, by at least one application program of said one or more application programs, said position data and said signature data; and
verifying, under control of said at least one application program, an authenticity and/or integrity of said position data at least partially based on said signature data.

10. The method according to claim 9, wherein said authenticity and/or integrity of said position data is verified further based on a public key accessible by said at least one application program.

11. The method according to claim 10, wherein, for each of said one or more application programs, an individual public key is accessible.

12. The method according to claim 9, the method further comprising at least one of the following, if said authenticity of said position data is verified:
identifying, under control of said at least one application program, said position data as trustworthy; or
processing, under control of said at least one application program, said position data.

13. The method according to claim 9, the method further comprising at least one of the following, if said authenticity of said position data is not verified:
identifying, under control of said at least one application program, said position data as potentially manipulated; or
rejecting, under control of said at least one application program, said position data.

14. A device comprising at least one processor and at least one memory including computer program code, the at least one memory and the computer program code configured to, with the at least one processor, cause said device at least to:
establish or initiate establishment of a secure communication path to a remote device for receiving one or more signature parameter data sets;
receive said one or more signature parameter data sets, said signature parameter data sets each comprising respective one or more parameters for use as input of a respective digital signature algorithm, said signature parameter data sets received via said secure communication path from said remote device;
estimate a position of said device at least partially based on one or more radio signal parameters obtained by said device, wherein position data representing said estimated position of said device are obtained as a result of said estimating;
determine a digital signature of said position data by providing at least said position data and the at least one of said one or more signature parameter data sets as input to the respective digital signature algorithm and causing the digital signature algorithm to generate signature data representing said digital signature of said position data based at least in part on said position data and the at least one of said one or more signature parameter data sets; and
provide said position data and said signature data to one or more application programs.

15. The device according to claim 14, wherein said one or more application programs are at least two application programs, and wherein, for each of said at least two application programs, a respective individual signature parameter data set associated with a respective application program of said at least two application programs is obtained such that said one or more signature parameter data sets are at least two individual signature parameter data sets.

16. The device according to claim 15, wherein, for each of said at least two application programs, a respective individual digital signature is determined at least partially based on said respective individual signature parameter data set obtained for said respective application program of said at least two application programs.

17. The device according to claim 16, wherein respective individual signature data are provided to each of said at least two application programs representing said respective individual digital signature determined for said respective application program of said at least two application programs.

18. The device according to claim 14, wherein the at least one memory and the computer program code are further configured to, with the at least one processor, cause said device at least to:
receive, by at least one application program of said one or more application programs, said position data and said signature data; and
verify, under control of said at least one application program, an authenticity and/or integrity of said position data at least partially based on said signature data.

19. The device according to claim 18, wherein the at least one memory and the computer program code are further configured to, with the at least one processor, cause said device to perform at least one of the following, if said authenticity of said position data is verified:
identify, under control of said at least one application program, said position data as trustworthy; or
process, under control of said at least one application program, said position data.

20. A non-transitory computer-readable storage medium storing computer program code that is configured, upon execution, to:
establish or initiate establishment of a secure communication path to a remote device for receiving one or more signature parameter data sets;
receive said one or more signature parameter data sets, said signature parameter data sets each comprising respective one or more parameters for use as input of a respective digital signature algorithm, said signature parameter data sets received via said secure communication path from said remote device;
estimate a position of a mobile device at least partially based on one or more radio signal parameters obtained by said mobile device, wherein position data representing said estimated position of said mobile device are obtained as a result of said estimating;

determine a digital signature of said position data by providing at least said position data and the at least one of said one or more signature parameter data sets as input to the respective digital signature algorithm and causing the digital signature algorithm to generate signature data representing said digital signature of said position data based at least in part on said position data and the at least one of said one or more signature parameter data sets; and provide said position data and said signature data to one or more application programs.

\* \* \* \* \*